(12) United States Patent
Kuroki et al.

(10) Patent No.: US 11,493,833 B2
(45) Date of Patent: Nov. 8, 2022

(54) INDOOR CAMERA

(71) Applicant: PANASONIC INTELLECTUAL PROPERTY MANAGEMENT CO., LTD., Osaka (JP)

(72) Inventors: Kenichi Kuroki, Fukuoka (JP); Hiroyuki Noda, Fukuoka (JP); Akira Katayama, Fukuoka (JP); Shinichi Takamatsu, Fukuoka (JP); Kumiko Kawazoe, Fukuoka (JP); Yusuke Oshikata, Fukuoka (JP); Atsushi Ikarashi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 17/144,291

(22) Filed: Jan. 8, 2021

(65) Prior Publication Data

US 2021/0216000 A1 Jul. 15, 2021

(30) Foreign Application Priority Data

Jan. 10, 2020 (JP) .............................. JP2020-003122

(51) Int. Cl.
*G03B 17/56* (2021.01)
*F16M 11/20* (2006.01)
(Continued)

(52) U.S. Cl.
CPC ............ *G03B 17/561* (2013.01); *F16B 47/00* (2013.01); *F16M 11/04* (2013.01); *F16M 11/10* (2013.01);
(Continued)

(58) Field of Classification Search
CPC ........ G03B 17/56; F16M 11/04; F16M 11/12; F16M 11/10; F16M 11/18
(Continued)

(56) References Cited

U.S. PATENT DOCUMENTS 10,641,314 B1 * 5/2020 Fan ...................... F16B 47/006
10,851,828 B2 * 12/2020 Yang ...................... F04B 37/14
(Continued)

FOREIGN PATENT DOCUMENTS

JP 2002305600 A * 10/2002
JP 2005260641 A * 9/2005
(Continued)

*Primary Examiner* — Clayton E. LaBalle
*Assistant Examiner* — Kevin C Butler
(74) *Attorney, Agent, or Firm* — Greenblum & Bernstein, P.L.C.

(57) ABSTRACT

An indoor camera includes: an image capturing unit; a pan mechanism configured to drive a pan motor to rotate the image capturing unit around a vertical axis; a motor holder housing the pan mechanism and having a contact surface parallel to a horizontal axis on a bottom surface; a suction cup having an internal space and formed of an elastic member, the suction cup having upper and lower openings in upper and lower portions of the internal space, respectively; and a suction cup holder fixed to the suction cup and configured to support a load of a main mechanism portion housing the image capturing unit and the pan mechanism. The lower opening is closed by an installation surface on which the suction cup is installed. The upper opening is configured to seal the internal space by supporting the contact surface by the load of the main mechanism portion.

20 Claims, 20 Drawing Sheets

(51) Int. Cl.
*F16M 13/02* (2006.01)
*F16B 47/00* (2006.01)
*F16M 11/10* (2006.01)
*F16M 11/18* (2006.01)
*F16M 13/00* (2006.01)
*F16M 11/04* (2006.01)
*F16M 11/12* (2006.01)

(52) U.S. Cl.
CPC ............. *F16M 11/12* (2013.01); *F16M 11/18* (2013.01); *F16M 11/2014* (2013.01); *F16M 13/005* (2013.01); *F16M 13/022* (2013.01)

(58) Field of Classification Search
USPC ........................................................ 396/428
See application file for complete search history.

(56) References Cited

U.S. PATENT DOCUMENTS

| | | | | |
|---|---|---|---|---|
| 2003/0058363 | A1* | 3/2003 | Boyden | H04N 7/144 |
| | | | | 348/375 |
| 2003/0193588 | A1* | 10/2003 | Yuen | F16M 11/18 |
| | | | | 348/E5.042 |
| 2020/0116193 | A1* | 4/2020 | Frydenger | F16M 11/041 |
| 2021/0048061 | A1* | 2/2021 | Yang | H04B 1/3888 |
| 2021/0216000 | A1* | 7/2021 | Kuroki | F16M 13/005 |
| 2022/0093420 | A1* | 3/2022 | Shinohara | B08B 1/02 |

FOREIGN PATENT DOCUMENTS

| | | | | |
|---|---|---|---|---|
| JP | 2008228687 A | * | 10/2008 | |
| JP | 2013-223033 | | 10/2013 | |
| JP | 2013223033 | * | 10/2013 | ............. H04N 7/173 |
| WO | WO-2004027513 A1 | * | 4/2004 | ............. F16M 11/10 |

\* cited by examiner

INDOOR CAMERA

CROSS-REFERENCE TO RELATED APPLICATIONS

This application claims the benefit of priority of Japanese Patent Application No. 2020-003122 filed on Jan. 10, 2020, the entire contents of which are incorporated herein by reference.

FIELD

The present disclosure relates to an indoor camera.

BACKGROUND

In the related art, a network camera apparatus for pet photography placed indoors is known (for example, JP-A-2013-223033). The network camera apparatus includes: a water container that allows a pet to drink water; a feeding container that allows the pet to eat food; a camera unit for photographing the pet to acquire a pet image; a network unit for connecting to a network to perform data communication with a client including transmission of a pet image to the client; a controller that controls units of the apparatus; and a holding unit that holds at least the camera unit above the water container or/and the feeding container by a predetermined distance.

SUMMARY

However, since the network camera apparatus of JP-A-2013-223033 has a structure disposed with a large installation area such as the water container, it is considered that it is difficult to install the network camera apparatus in a place such as on a TV stand, on a table, on a bed where it is easy to capture an image of the pet in a bird's-eye view. However, in consideration of a fact that the pet moves in reality, it is preferable that a camera that captures an image of a pet can be flexibly installed in various indoor places. Therefore, for example, when a pet such as a cat indoors moves, for example, walks or jumps, or plays nearby, the pet may be in contact with or collide with an indoor camera. Therefore, there is a possibility that the related-art camera cannot continue to capture an image of a pet due to an overturn or a fall.

The present disclosure is proposed in view of the above situation in the related art, and an object thereof is to provide an indoor camera that can prevent an overturn due to an external force from a side received from a moving object such as a pet, and can more accurately capture an image of the moving object such as a pet that moves around indoors.

The present disclosure provides an indoor camera including: an image capturing unit; a pan mechanism configured to drive a pan motor to rotate the image capturing unit around a vertical axis; a motor holder that houses the pan mechanism, the motor holder having a contact surface parallel to a horizontal axis on a bottom surface; a suction cup having an internal space and formed of an elastic member, the suction cup having an upper opening in an upper portion of the internal space and a lower opening in a lower portion of the internal space; and a suction cup holder fixed to the suction cup and configured to support a load of a main mechanism portion that houses the image capturing unit and the pan mechanism, wherein the lower opening is closed by an installation surface on which the suction cup is installed, and wherein the upper opening is configured to seal the internal space by supporting the contact surface by the load of the main mechanism portion.

According to the present disclosure, an overturn due to an external force from a side received from a moving object such as a pet can be prevented, and an image of the moving object such as a pet that moves around indoors can be more accurately captured.

DETAILED DESCRIPTION

Hereinafter, embodiments in which an indoor camera according to the present disclosure is specifically disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Figure 1:
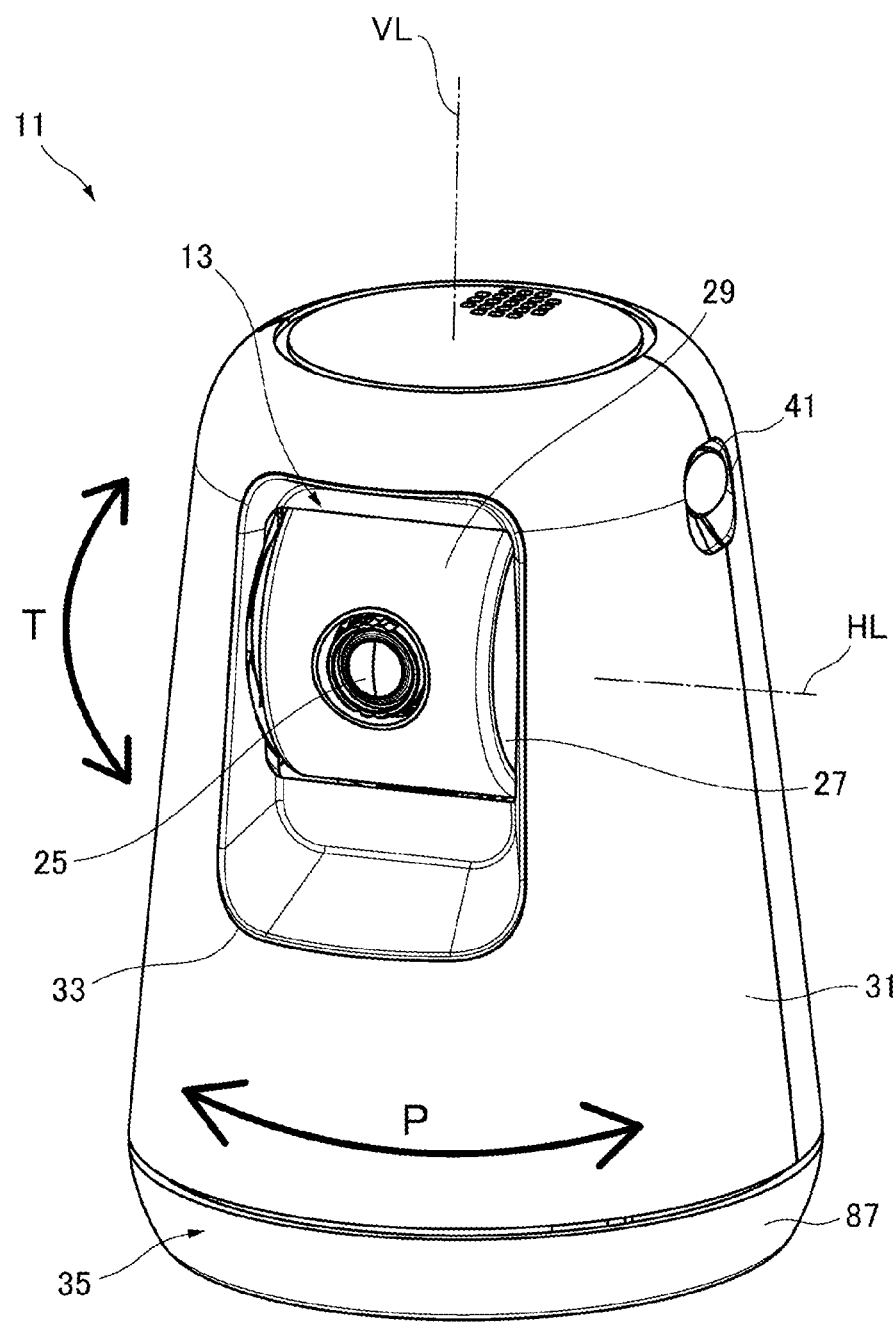
FIG. 1 is an external perspective view of an indoor camera according to a first embodiment.

FIG. 1 is an external perspective view of an indoor camera 11 according to a first embodiment. The indoor camera 11 according to the first embodiment includes at least an image capturing unit 13 (see FIG. 2), a tilt mechanism 15, a pan mechanism 17 (see FIG. 2), a motor holder 19 (see FIG. 6), a suction cup 21 (see FIG. 6), and a suction cup holder 23 (see FIG. 6). An example in which the indoor camera 11 according to the first embodiment captures an image of a pet as an image capturing target will be described. However, the image capturing target is not limited to a pet and may be, for example, a child or an elderly person.

The image capturing unit 13 includes at least a lens 25 and an image sensor (not shown). The lens 25 and the image capturing unit 13 convert an optical object image obtained by focusing light incident from an outside of the indoor camera 11 on an image sensor image capturing surface to output an image capturing signal. The image sensor is a solid-state image capturing element of, for example, charge coupled devices (CCD) or a complementary metal oxide semiconductor (CMOS). The lens 25 is disposed in a cylindrical surface 29 of an image capturing housing 27.

The cylindrical surface 29 of the image capturing housing 27 is disposed in an image capturing opening 33 formed in a rectangular shape in an upper cabinet 31 that is an exterior member of the indoor camera 11. The image capturing housing 27 is tilt-rotatable in an arrow T direction around a horizontal axis HL that coincides with a central axis of the cylindrical surface 29, and is supported by the tilt mechanism 15 (see FIG. 2). The image capturing unit 13 is tilt-rotated such that an image of the pet can be captured from the image capturing opening 33 formed in the image capturing housing 27. That is, the image capturing unit 13 of the indoor camera 11 according to the first embodiment is tilt-rotated by the tilt mechanism 15 at an angle corresponding to a size of the image capturing opening 33.

The indoor camera 11 includes a cylindrical base cabinet 35 under the upper cabinet 31. The base cabinet 35 includes a suction cup unit 37 (see FIG. 3) inside. The base cabinet 35 is installed on a flat installation surface 39 such as a closet, a bookshelf, or a table top plate via the suction cup unit 37. In the indoor camera 11, the suction cup unit 37 is installed on the installation surface 39, and the upper cabinet 31 is pan-rotatable in an arrow P direction around a vertical axis VL with respect to the base cabinet 35 and is supported by the pan mechanism 17 (see FIG. 2). Accordingly, the image capturing unit 13 can be tilt-rotated and pan-rotated.

A plurality of pet detection sensors 41 are provided in an upper side surface of the upper cabinet 31. The plurality of pet detection sensors 41 are connected to a controller 43 (see FIG. 2) provided inside the upper cabinet 31, and output a detected heat source position to the controller 43 as a position of the pet (moving object). Based on the input position of the pet (the moving object), the controller 43 drives a tilt motor 45 or a pan motor 47 such that the pet (the moving object) is positioned in an image capturing region of the image capturing unit 13. Based on differences among a plurality of captured images captured continuously, the controller 43 measures a movement amount of a feature point that appears in the plurality of captured images. Based on whether the measured movement amount of the feature point is larger than a predetermined threshold, the controller 43 detects (determines) presence or absence of the moving object such as a pet.

The controller 43 is configured by using, for example, a central processing unit (CPU), a digital signal processor (DSP), or a field programmable gate array (FPGA), and controls operations of units of the indoor camera 11. The controller 43 comprehensively performs various processings and control in cooperation with a memory (not shown) provided in the indoor camera 11. Specifically, the controller 43 refers to a program and data held in the memory and executes the program, so that functions of the units (for example, a function of driving the tilt mechanism 15 or the pan mechanism 17 according to a position of the pet (the moving object) detected by the plurality of pet detection sensors 41, a function of detecting (determining) presence or absence of the moving object such as a pet based on movement amounts of feature points of a plurality of captured images captured by the image capturing unit 13, a function of recording a captured image obtained by capturing an image of the pet (the moving object), and the like) are implemented.

The plurality of pet detection sensors 14 are so-called infrared sensors, and detect, for example, a body temperature of a moving object such as a pet, a child, or an elderly person as a heat source. The plurality of pet detection sensors 14 output the detected heat source position to the controller 43 as a position of the pet (the moving object).

When a detection signal that detects the pet (the moving object) is input from any one of the plurality of pet detection sensors 41, the controller 43 controls driving of the tilt mechanism 15 and the pan mechanism 17 such that the image capturing region of the image capturing unit 13 follows the pet and captures an image of the pet according to the position of the pet (the moving object) included in the detection signal. Accordingly, the indoor camera 11 according to the first embodiment can capture an image of the moving pet while tracking the pet.

Figure 2:
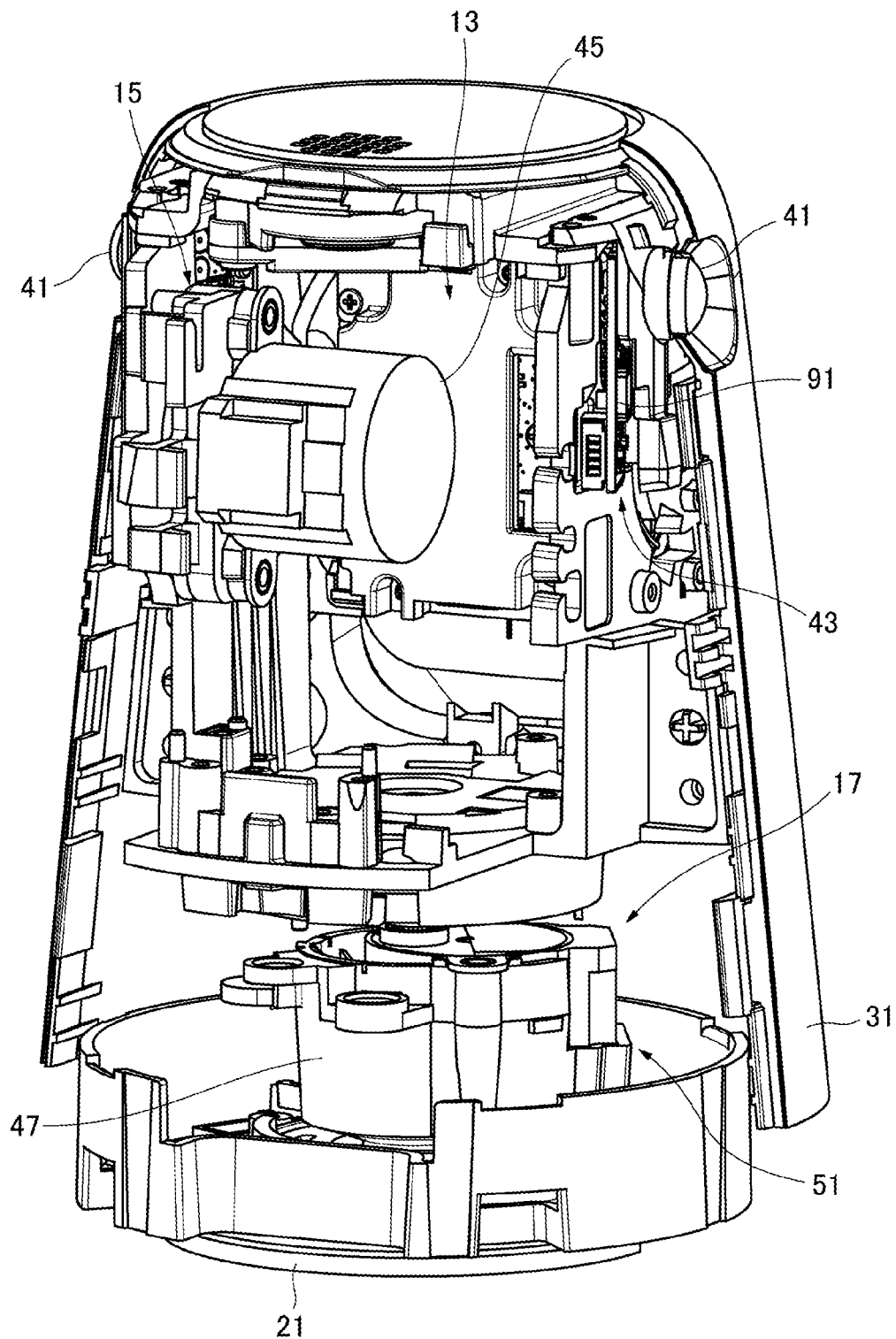
FIG. 2 is an internal perspective view of the indoor camera according to the first embodiment when viewed from a back surface side.

FIG. 2 is an internal perspective view of the indoor camera 11 according to the first embodiment when viewed from a back surface side. The tilt mechanism 15 and the pan mechanism 17 will be described with reference to FIG. 2.

The tilt mechanism 15 includes the tilt motor 45 for tilt-rotating the image capturing housing 27 (that is, the image capturing unit 13). The tilt motor 45 is driven by a built-in power supply or an external power supply of the indoor camera 11, and operates the tilt mechanism 15 to tilt-rotate the image capturing housing 27 in the arrow T direction around the horizontal axis HL. Accordingly, the image capturing unit 13 can rotate in the arrow T direction and can capture an image while changing the image capturing region.

The pan mechanism 17 includes the tilt mechanism 15 and the motor holder 19 for pan-rotating the upper cabinet 31. The pan motor 47 is driven by the built-in power supply or the external power supply, operates the pan mechanism 17, and pan-rotates the upper cabinet 31, the tilt mechanism 15, and the image capturing unit 13 in the arrow P direction around the vertical axis VL. Accordingly, the image capturing unit 13 can rotate in the arrow P direction and can capture an image while changing the image capturing region. A rotation range of the pan motor 47 in the first embodiment is, for example, 306°. It is needless to say that the rotation range of the pan motor 47 is an example and is not limited thereto.

Figure 3:
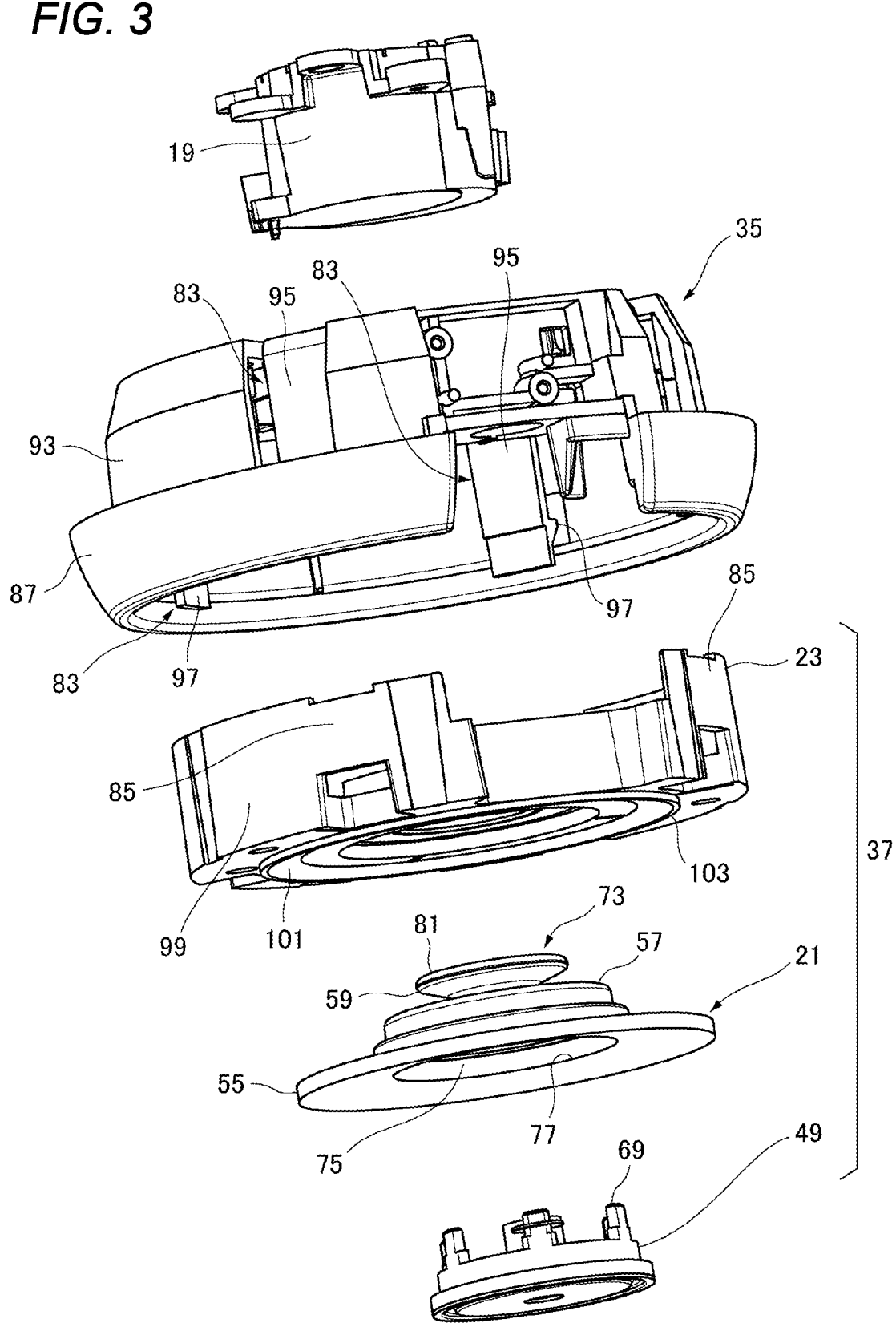
FIG. 3 is an exploded perspective view of a motor holder, a base cabinet, and a suction cup unit of the indoor camera.

FIG. 3 is an exploded perspective view of the motor holder 19, the base cabinet 35, and the suction cup unit 37 of the indoor camera 11. The suction cup unit 37 includes the suction cup holder 23, the suction cup 21, and a suction cup core member 49.

The base cabinet 35 houses the suction cup unit 37 configured with the suction cup 21, the suction cup holder 23, and the suction cup core member 49 inside. Since the suction cup core member 49 is fitted into a lower surface of the suction cup 21, the suction cup 21 has a rigidity that can support a load of a main mechanism portion 51 configured with the controller 43, the image capturing unit 13, the tilt mechanism 15, the pan mechanism 17, the upper cabinet 31, the base cabinet 35, the plurality of pet detection sensors 41, and the like, in which the controller 43, the image capturing unit 13, the tilt mechanism 15, and the pan mechanism 17 are housed in the upper cabinet 31 other than the suction cup unit 37 of the indoor camera 11. The suction cup 21 into which the suction cup core member 49 is fitted is fixed integrally with the suction cup holder 23 covered from above.

The suction cup unit 37 is fixed by sucking the lower surface of the suction cup 21 to the installation surface 39. The base cabinet 35 is connected to the suction cup holder 23 of the suction cup unit 37 and cannot rotate in the arrow P direction around the vertical axis VL. Inside the base cabinet 35 connected to the suction cup unit 37, the pan motor 47 is disposed via the motor holder 19. The load of the main mechanism portion 51 including a configuration other than the suction cup unit 37 of the indoor camera 11 such as the tilt motor 45, the pan motor 47, and the upper cabinet 31 is applied to the motor holder 19. That is, when the indoor camera 11 is installed on the installation surface 39 by a user, the load of the main mechanism portion 51 is applied to a motor holder support portion 73 of the suction cup 21 of the suction cup unit 37 via the motor holder 19.

Figure 4:
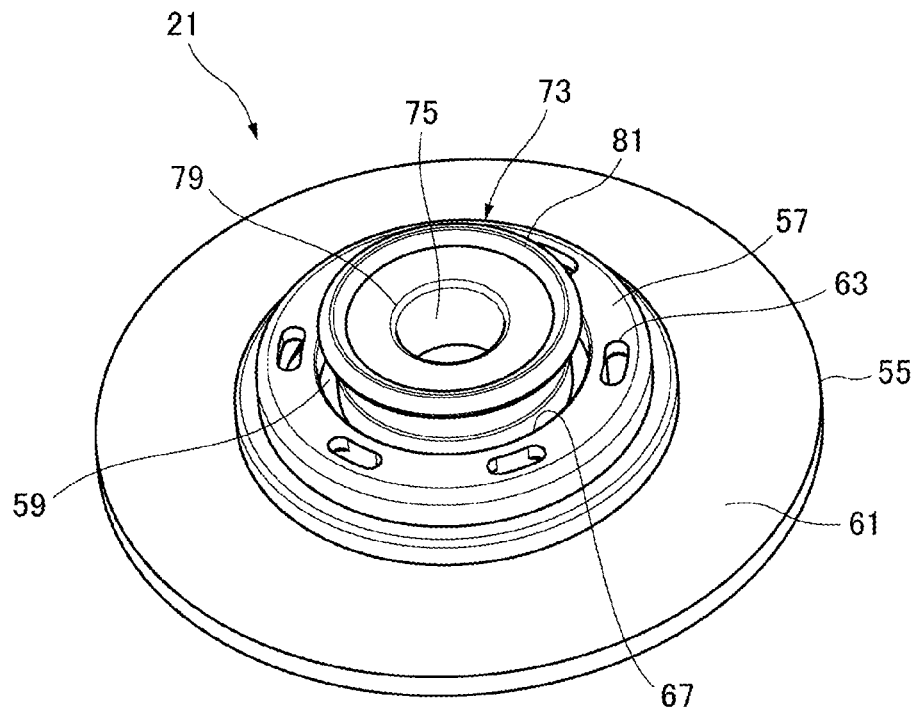
FIG. 4 is a perspective view of a suction cup.

FIG. 4 is a perspective view of the suction cup 21. The suction cup 21 will be described with reference to FIG. 4.

The suction cup 21 of the indoor camera 11 according to the first embodiment has a predetermined rubber hardness C. The rubber hardness becomes softer when a numerical value becomes smaller, and becomes harder when the numerical value becomes larger. The rubber hardness is, for example, about 40° for an eraser and 60° or more for a tire of an automobile. The predetermined rubber hardness C adopted for the suction cup 21 in the first embodiment is 40°. The rubber hardness C is not limited thereto. The rubber hardness of the suction cup 21 according to the first embodiment may be, for example, 30° to 50°.

Since the suction cup 21 has the predetermined rubber hardness C, the suction cup 21 has a suction property to a contact surface 53 (see FIG. 6) of the motor holder 19 and the installation surface 39, shape stability, and the like. When the rubber hardness C of the suction cup 12 is close to, for example, 50°, the shape stability of the suction cup 21 during support of the load of the main mechanism portion 51 is improved.

When the rubber hardness C of the suction cup 21 is close to, for example, 30°, the suction property during contact with the contact surface 53 is improved. Further, when the rubber hardness C is small, the suction cup 12 improves a following property of following a movement of the indoor camera 11 in a horizontal direction while maintaining a suction state to the installation surface 39 when receiving an external force F.

The suction cup 21 is formed by forming a disk-shaped suction cup lower portion 55, a suction cup fixing portion 57 formed with a diameter smaller than that of the suction cup lower portion 55, and a suction cup upper portion 59 formed with a diameter smaller than that of the suction cup fixing portion 57 as concentric circles centered on the vertical axis VL.

An upper surface of the suction cup lower portion 55 is a lower portion upper surface 61 having an outermost peripheral portion in the suction cup 21. A plurality of core member exposing holes 63 are bored in the suction cup fixing portion 57 in a circumferential direction. The plurality of core member exposing holes 63 are airtightly closed by fitting erecting pieces of the suction cup core member 49, which will be described later. A fixed peripheral groove 67 into which a fixing cylinder 65 (see FIG. 6) of the suction cup holder 23 is fitted is formed on an inner side in a radial direction around the vertical axis VL than the plurality of core member exposing holes 63. Further, core member fitting portions 71 into which the erecting pieces 69 (see FIG. 3) of the suction cup core member 49 are fitted are formed in a lower surface of the suction cup fixing portion 57.

The motor holder support portion 73 that protrudes above the suction cup fixing portion 57 is formed on the suction cup upper portion 59. The motor holder support portion 73 includes an upper opening 79 that communicates with an internal space 75, and an R-shaped portion 81 that is formed on a peripheral edge portion of the upper opening 79 and is in contact with the contact surface 53 of the motor holder 19 to support the load of the main mechanism portion 51.

Figure 5:
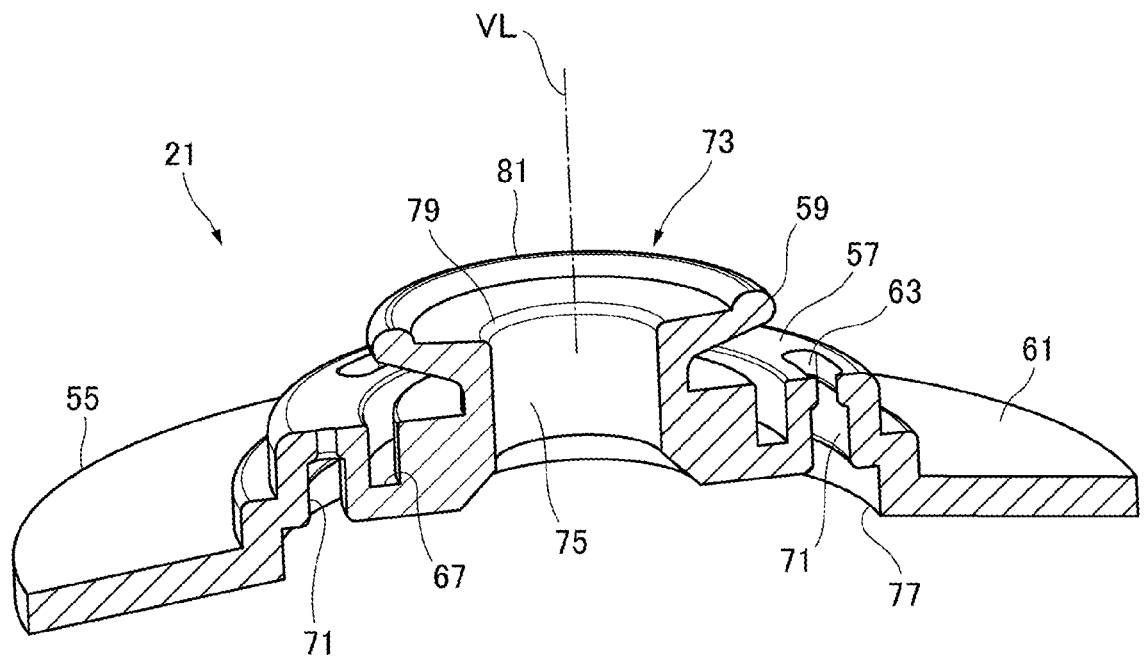
FIG. 5 is a vertical cross-sectional view of the suction cup.

FIG. 5 is a vertical cross-sectional view of the suction cup 21.

The suction cup lower portion 55 includes a lower opening 77 that communicates with the internal space 75 inside. Inside the suction cup upper portion 59, the upper opening 79 that communicates with the internal space 75 is opened in a central portion of the motor holder support portion 73 as a concentric circle centered on the vertical axis VL.

The R-shaped portion 81 protrudes upward from the suction cup upper portion 59 that is in contact with the contact surface 53 of the motor holder 19, and is formed concentrically. That is, in the suction cup 21, the R-shaped portion 81 and the upper opening 79 are in contact with and support the contact surface 53 of the motor holder 19 in an annular shape.

Figure 6:
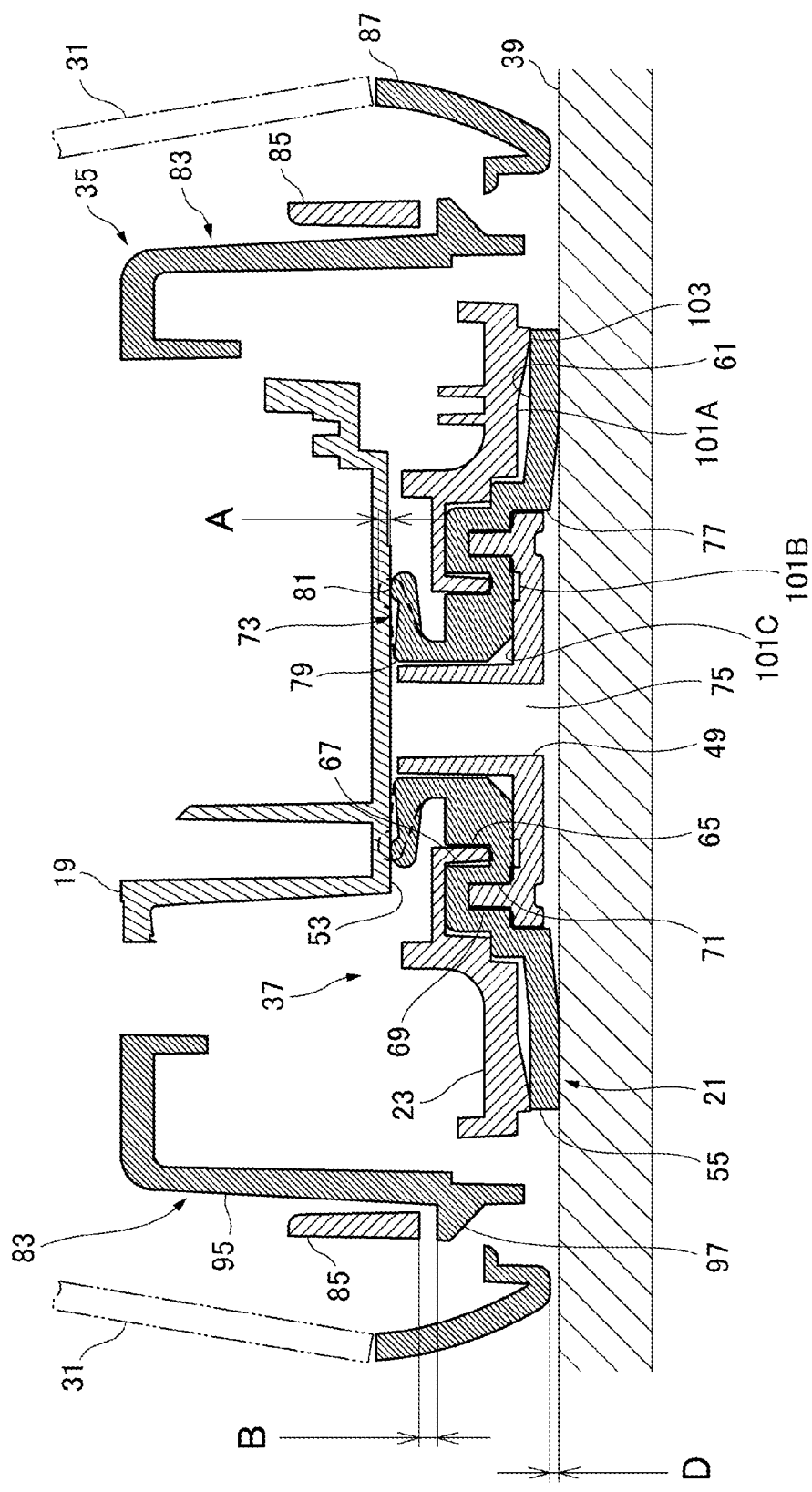
FIG. 6 is a vertical cross-sectional view of a lower structure of the indoor camera during installation.

In FIG. 6, a vertical cross-sectional view of the indoor camera 11 taken along a cross-sectional line obtained by extending an E-E cross-sectional line shown in FIG. 9 will be described. FIG. 6 is a vertical cross-sectional view of a lower structure of the indoor camera 11 during installation. In FIG. 6, the indoor camera 11 is installed on the installation surface 39 by the user. That is, the upper opening 79 and the R-shaped portion 81 of the suction cup 21 are in contact with the contact surface 53 of the motor holder 19 to support the load of the main mechanism portion 51. Further, the vertical cross-sectional view of the indoor camera 11 shown in FIG. 6 is the E-E cross-sectional view of the lower structure of the indoor camera 11 taken along the E-E cross-sectional line shown in FIG. 9.

The main mechanism portion 51 and the motor holder 19 are placed on the suction cup 21 of the suction cup unit 37, and the load of the main mechanism portion 51 is applied to the suction cup 21. In the suction cup 21, the peripheral edge portion of the upper opening 79 is compressed (deformed) by a load received from the contact surface 53 of the motor holder 19 with a predetermined compression allowance A. In the suction cup 21, when the indoor camera 11 is installed on the installation surface 39 by the user, the lower opening 77 is closed by the installation surface 39. Further, in the suction cup 21, the upper opening 79 is closed by the contact surface 53 of the motor holder 19, and the peripheral edge portion of the upper opening 79 is compressed by a predetermined compression allowance A due to the load of the main mechanism portion 51 supported by the motor holder 19 so as to provide support. Accordingly, when the indoor camera 11 (that is, the main mechanism portion 51) is inclined by receiving an external force F in a horizontal direction on the indoor camera 11 due to a moving object such as a pet, the suction cup 21 can maintain a contact state with the motor holder 19 by deforming the upper opening 79 according to the compression allowance A, and can maintain the internal space 75 in a sealed state.

Accordingly, the indoor camera 11 including the suction cup 21 is installed in contact with the horizontal installation surface 39 installed by the user and the contact surface 53 of the motor holder 19.

In the indoor camera 11 according to the first embodiment, the predetermined compression allowance A is set to A=0.9 mm. The compression allowance A is not limited thereto. The compression allowance A of the suction cup 21 according to the first embodiment may be, for example, 0.4 mm to 2.0 mm.

When the compression allowance A is large (for example, 0.9 mm to 2.0 mm), the suction cup 12 is likely to be deformed in shape according to an inclination of the indoor camera 11, and a contact state between the upper opening 79 and the contact surface 53 of the motor holder 19 can be more easily maintained. Accordingly, when the compression allowance A is large, the suction cup 21 can more easily maintain the contact state between the upper opening 79 and the contact surface 53 of the motor holder 19 even when an inclination amount (an angle) of the indoor camera 11 (that is, the main mechanism portion 51) due to the external force F becomes large. Therefore, when the compression allowance A is large, the indoor camera 11 further improves durability against the external force F received from a side surface of the indoor camera 11.

When the compression allowance A is larger than 2.0 mm, a lifting height required for releasing contact between the upper opening 79 and the contact surface 53 of the motor holder 19 is increased, and therefore the suction cup 21 is not easy to release the contact. That is, when the indoor camera 11 having the compression allowance A larger than 2.0 mm is lifted in a vertical direction by the user, it is necessary to form a large predetermined fitting gap B for releasing the contact between the upper opening 79 and the contact surface 53 of the motor holder 19. Further, when the lifting height of the indoor camera 11 is insufficient, a suction state between the lower opening 77 and the installation surface 39 is not released, so that the indoor camera 11 is difficult to be lifted.

On the other hand, when the compression allowance A of the suction cup 21 is small (for example, 0.4 mm to 0.9 mm), shape deformation (deterioration) of the suction cup 21 can be prevented. When the compression allowance A of the suction cup 21 is less than 0.4 mm, a shape of the upper opening 79 is less likely to be deformed. Accordingly, in the indoor camera 11, since the upper opening 79 is less likely to follow an inclination of the contact surface 53 of the motor holder 19, a contact state with the motor holder 19 is more easily released. That is, the suction cup 21 having the compression allowance A of less than 0.4 mm is difficult to deform in shape by following the inclination amount (the angle) of the indoor camera 11 (that is, the main mechanism portion 51) caused by the external force F, which makes it more difficult to maintain a sealed state of the internal space 75.

The predetermined fitting gap B (see FIG. 10) for allowing an upward movement of the motor holder 19 with respect to the suction cup holder 23 and releasing a suction state of the suction cup 21 is provided between the base cabinet 35 and the suction cup holder 23. When the motor holder 19 is raised in a vertical direction from the installation surface 39 in conjunction with lifting of the upper cabinet 31 of the indoor camera 11 by the user, the suction state of the suction cup 21 is released. The motor holder 19 and the base cabinet 35 are engaged with each other by an engagement portion (not shown) such that the motor holder 19 and the base cabinet 35 cannot rotate relative to each other and cannot move relative to each other in the vertical direction.

Therefore, when the upper cabinet 31 is lifted by the user, the base cabinet 35 is lifted together with the upper cabinet 31, so that the predetermined fitting gap B becomes B=0, the suction state of the suction cup 21 is released, and the motor holder 19 is lifted via the base cabinet 35.

The base cabinet 35 and the suction cup holder 23 are connected by locking fitting claws 83 formed on the base cabinet 35 in fitting portions 85 formed in the suction cup holder 23. The predetermined fitting gap B provided between the motor holder 19 and the suction cup holder 23 is provided between the fitting claws 83 and the fitting portions 85. The predetermined fitting gap B serves as a play when the motor holder 19 is lifted. That is, the suction cup holder 23 is lifted by engaging the fitting claws 83 with the fitting portions 85 after the motor holder 19 is moved upward in the predetermined fitting gap B.

The predetermined fitting gap B is set to be larger than the predetermined compression allowance A of the suction cup 21 (B>A). That is, after the predetermined compression allowance A of the suction cup 21 is elastically returned to A=0 mm, the predetermined fitting gap becomes B=0 mm, and the suction cup 21 is lifted in the vertical direction by engaging the fitting claws 83 with the fitting portions 85.

In the indoor camera 11, when the motor holder 19 is placed on the suction cup 21 and loads of the main mechanism portion 51 and the motor holder 19 are supported by the suction cup 21, a predetermined gap D is formed between the base cabinet 35 and the installation surface 39. In the base cabinet 35, an annular frame portion 87 is formed on an outer side of the fitting claws 83. The annular frame portion 87 serves as a boundary with the upper cabinet 31 whose upper end is rotated.

The base cabinet 35 is provided with the predetermined gap D between a lower end of the annular frame portion 87 and the installation surface 39. The predetermined gap D of the indoor camera 11 according to the first embodiment is, for example, 0.5 mm or more.

Accordingly, when the external force F is applied from the side surface of the indoor camera 11 and the indoor camera 11 is inclined, the indoor camera 11 can further prevent a fact that a side opposite to a point where the external force F is applied to the base cabinet 35 is in contact with the installation surface 39 and becomes a fulcrum of an overturn of the indoor camera 11. That is, even when the indoor camera 11 is inclined by the external force F, since the base cabinet 35 is not in contact with the installation surface 39, a reaction force from the installation surface 39 is not received, and a possibility that the suction cup 21 is released from the suction state can be further reduced.

Figure 7:
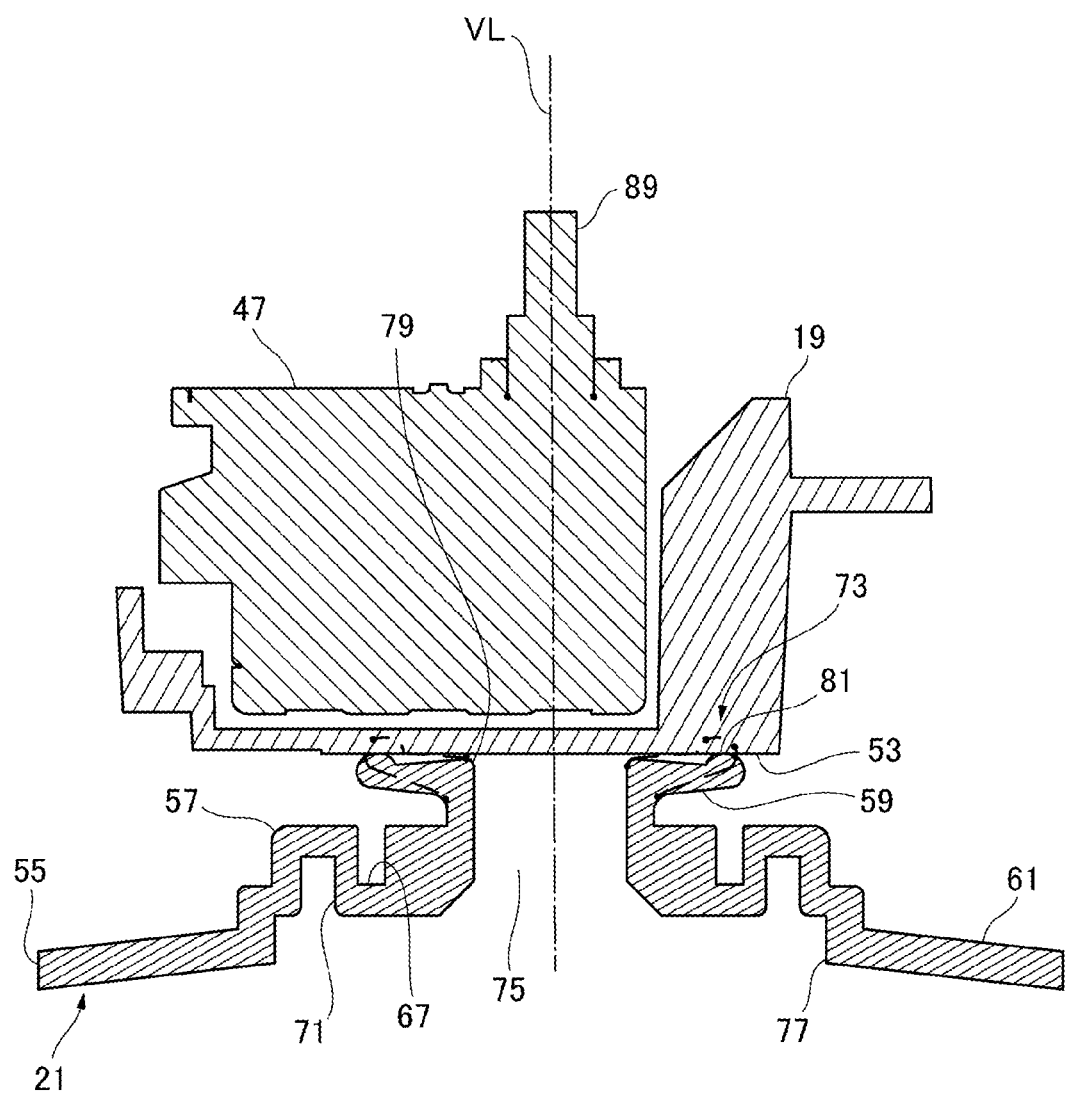
FIG. 7 is a vertical cross-sectional view of the motor holder and a pan motor during installation.

FIG. 7 is a vertical cross-sectional view of the motor holder 19 and the pan motor 47 during installation. In FIG. 7, only the suction cup 21, the motor holder 19, and the pan motor 47 are shown, and other configurations are omitted.

The pan motor 47 is fixedly installed on the motor holder 19. A driving shaft 89 pivotally supports the pan motor 47 and rotationally drives the pan motor 47 based on a driving signal generated by the controller 43. In the suction cup unit 37, the load of the main mechanism portion 51 including the image capturing unit 13, the tilt mechanism 15, the base cabinet 35, and the like, which are configurations other than that of the suction cup unit 37 in configurations of the indoor camera 11, is applied in a direction along the vertical axis VL. In the first embodiment, the driving shaft 89 and the suction cup 21 are arranged coaxially around the vertical axis VL.

In the indoor camera 11, the suction cup 21, the suction cup holder 23, the motor holder 19, the base cabinet 35, and the pan motor 47 are not rotated. On the contrary, the pan mechanism 17, the tilt mechanism 15, an electrical component 91 (see FIG. 2), and the upper cabinet 31 supported by the driving shaft 89 pan-rotate in the arrow P direction around the vertical axis VL.

Figure 8:
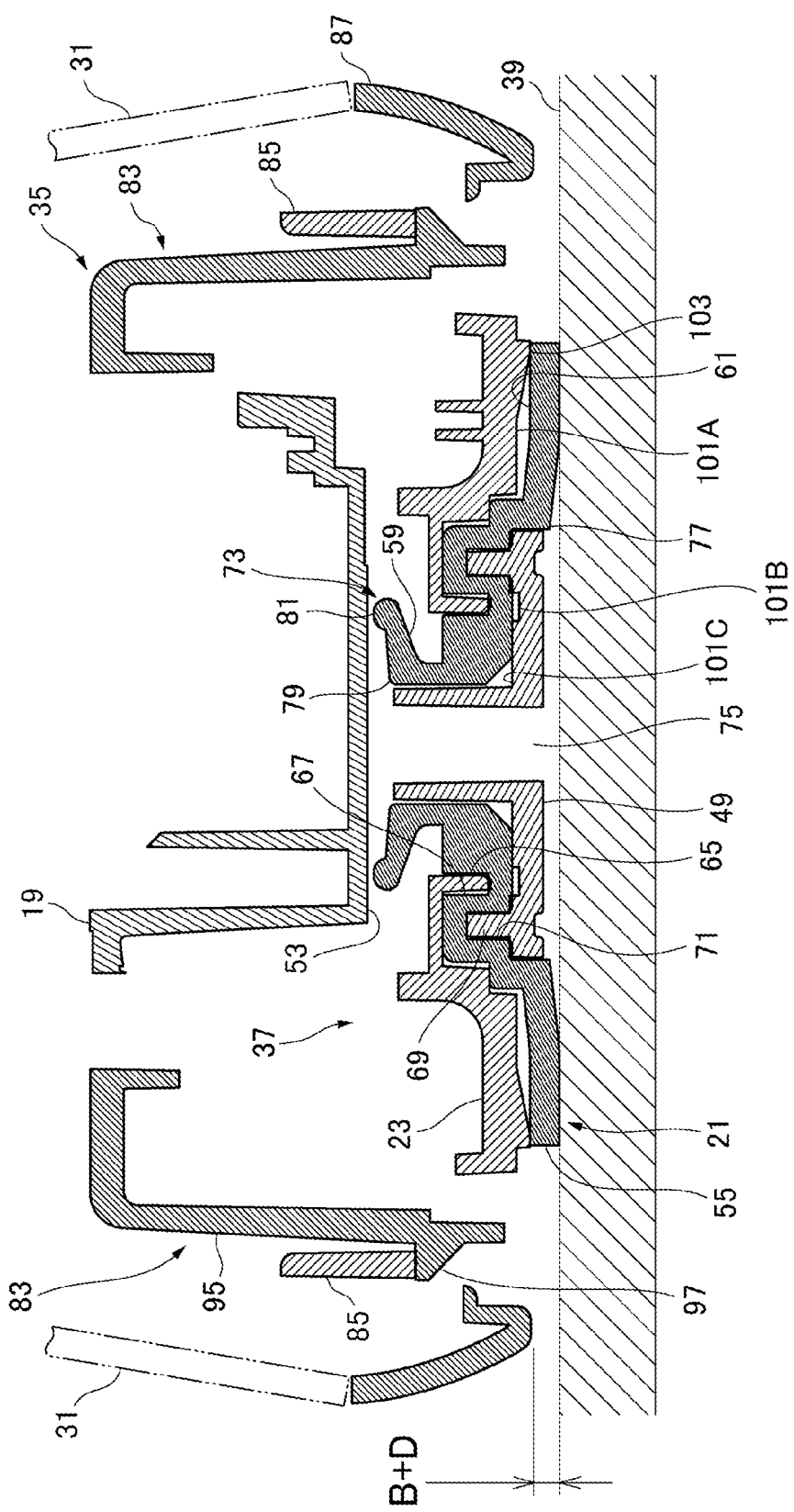
FIG. 8 is a vertical cross-sectional view of the lower structure of the indoor camera when a height B+D is reached.

FIG. 8 is a vertical cross-sectional view of the lower structure when the indoor camera 11 is lifted. In FIG. 8, the indoor camera 11 is lifted by the user by the predetermined fitting gap B, and a suction state of the suction cup 21 with respect to the motor holder 19 is released. Further, the lower opening 77 is in contact with the installation surface 39 and is closed.

When the upper cabinet 31 is lifted, the compression allowance A becomes A=0 mm, and the indoor camera 11 is lifted by releasing a suction state between the installation surface 39 and the suction cup 21 and a suction state between the contact surface 53 of the motor holder 19 and the suction cup 21.

At this time, since the predetermined fitting gap B exists in the indoor camera 11, the indoor camera 11 is lifted by being divided into members lifted first at the same time as the lifting and a member lifted after the predetermined fitting gap B disappears. The members lifted first together with the upper cabinet 31 are the motor holder 19, the pan mechanism 17, the tilt mechanism 15, the electrical component 91, and the base cabinet 35. The member lifted after the predetermined fitting gap B disappears is the suction cup unit 37. Therefore, when the predetermined fitting gap B disappears (that is, B=0), a distance between the base cabinet 35 and the installation surface 39 becomes B+D (see FIG. 8).

Figure 9:
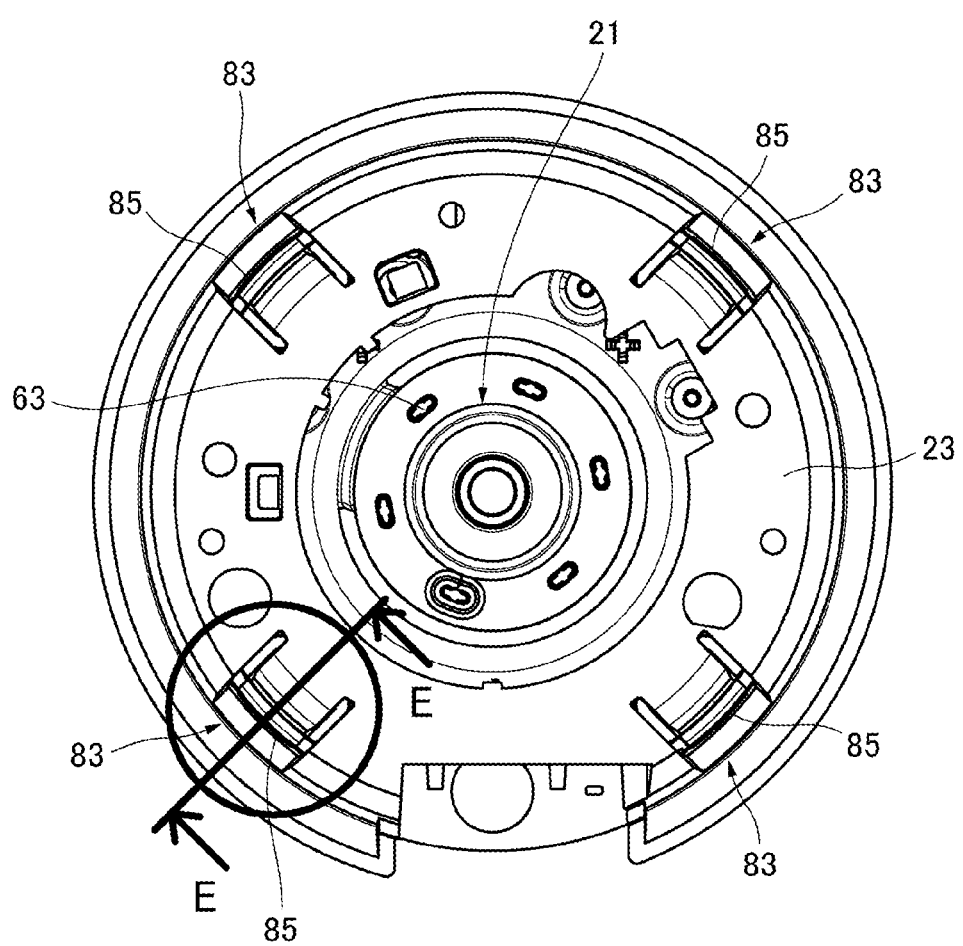
FIG. 9 is a plan view showing the suction cup unit and the base cabinet when viewed from an upper surface side of the indoor camera.

FIG. 9 is a plan view showing the suction cup unit 37 and the base cabinet 35 when viewed from an upper surface side of the indoor camera 11.

In the indoor camera 11, the motor holder 19 and the suction cup holder 23 are connected by the fitting claws 83 and the fitting portions 85 that are fitted with the predetermined fitting gap B. The fitting claws 83 and the fitting portions 85 are provided at least at four locations at equal intervals in a circumferential direction of the motor holder 19 and the suction cup holder 23, which are formed to have a substantially circular outer shape in a plan view. More specifically, the fitting claws 83 are formed on the base cabinet 35 fixed integrally with the motor holder 19.

Figure 10:
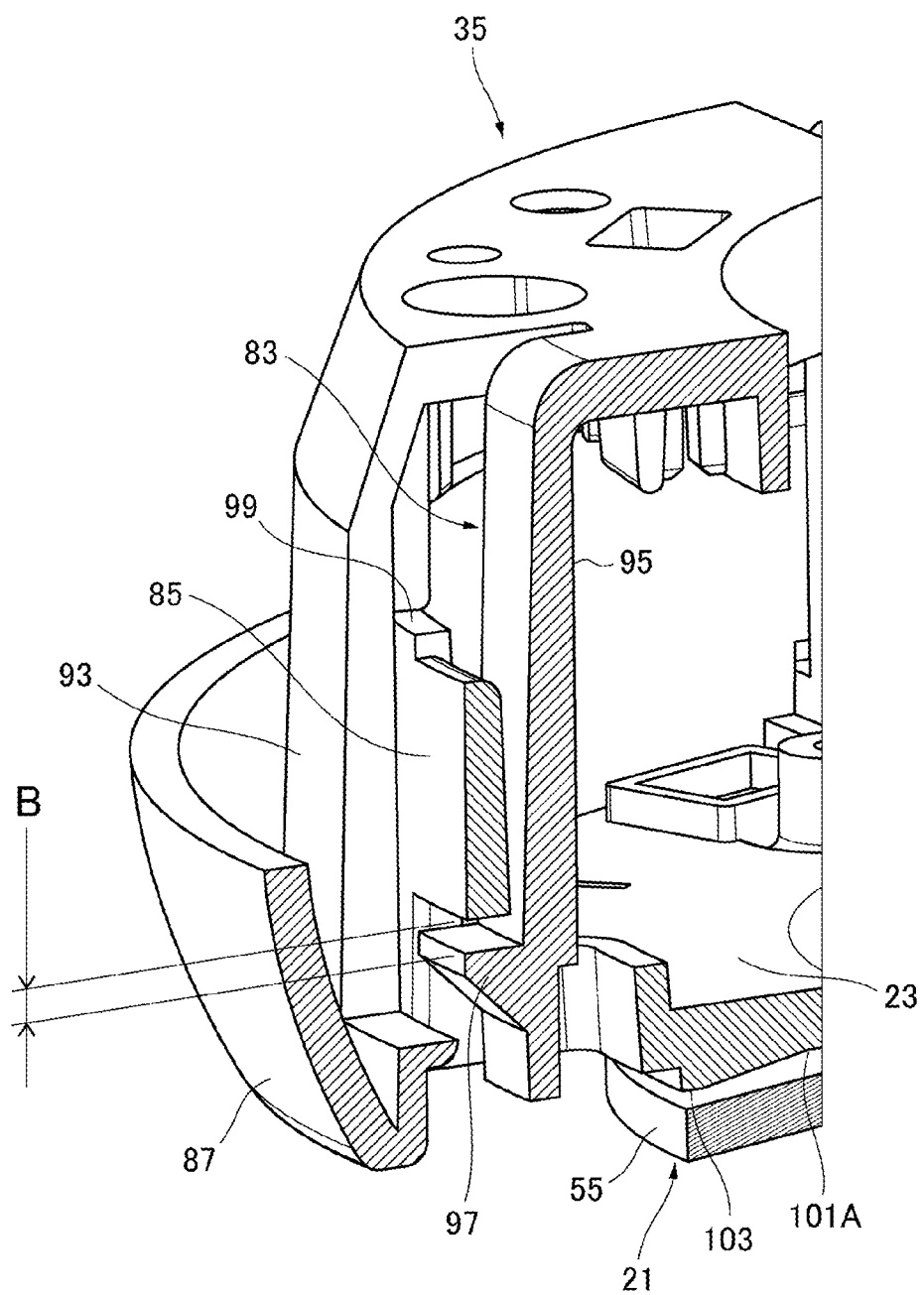
FIG. 10 is a cross-sectional view taken along a line E-E of FIG. 9.

FIG. 10 is a cross-sectional view taken along a line E-E of FIG. 9. Structures of the fitting claw 83 and the fitting portion 85 will be described with reference to FIG. 10.

The fitting claw 83 is formed on a cabinet peripheral wall 93 of the base cabinet 35 by an arm portion 95 that extends downward and a claw portion 97 formed to protrude outward from a lower portion of the arm portion 95.

The fitting portion 85 is formed as a cutout portion in which a holder peripheral wall 99 (see FIG. 3) of the suction cup holder 23 is cut out, and has the predetermined fitting gap B between the fitting portion 85 and the facing claw portion 97. When the base cabinet 35 is lowered from above the suction cup holder 23, the arm portion 95 is elastically deformed on an inner side in a radial direction around the vertical axis VL by an inclined surface of the claw portion 97, and then the claw portion 97 is locked in the fitting portion 85 as the cutout portion, so that the base cabinet 35 is connected to the suction cup holder 23.

Figure 11:
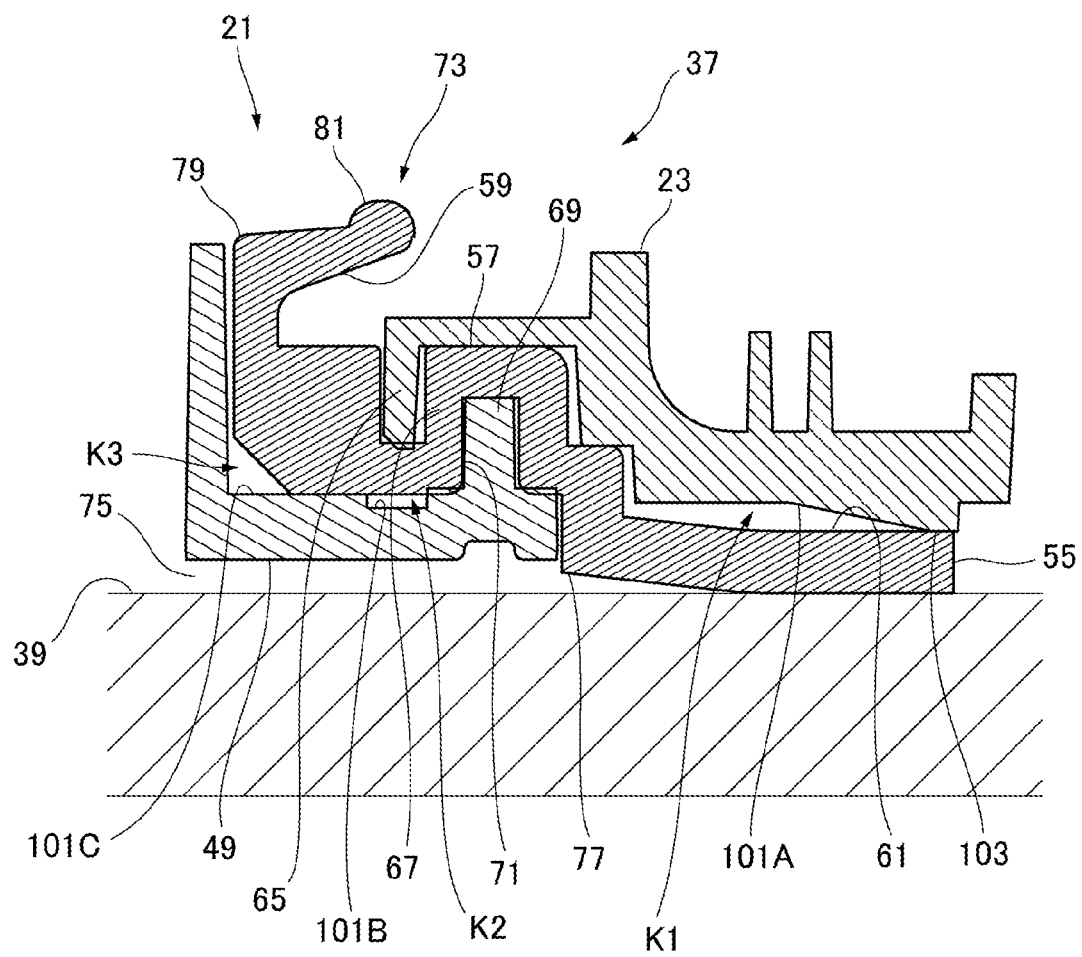
FIG. 11 is an enlarged vertical cross-sectional view of main parts showing an example of a plurality of free space forming portions.

FIG. 11 is an enlarged vertical cross-sectional view of main parts showing an example of a plurality of free space forming portions 101A, 101B, and 101C. The plurality of free space forming portions 101A to 101C will be described with reference to FIG. 11.

The suction cup holder 23 of the indoor camera 11 includes a downward erecting portion 103 that contacts an outermost peripheral portion of the lower portion upper surface 61 of the suction cup 21. Further, the suction cup holder 23 is formed on a suction cup receiving surface of the suction cup holder 23, and includes the free space forming portion 101A that is not in contact with the lower portion upper surface 61 of the suction cup 21 on an inner side in a radial direction with respect to the downward erecting portion 103. Accordingly, since the downward erecting portion 103 only presses an outermost peripheral portion of the suction cup lower portion 55, the suction cup holder 23 can apply, in a concentrated manner, the load of the main mechanism portion 51 applied by the upper opening 79 supporting the motor holder 19 to an outermost peripheral portion of the suction cup lower portion 55.

In the free space forming portion 101A, the suction cup lower portion 55 enables free deformation such as deflection in a free space K1 between the free space forming portion 101 and the lower portion upper surface 61. In a case where the external force F in a horizontal direction is applied from the side surface of the indoor camera 11, the free space K1 functions as a space when the suction cup 21 that supports the main mechanism portion 51 is deformed.

Accordingly, even when the external force F is applied from the side surface of the indoor camera 11 and the indoor camera 11 is inclined with respect to the vertical axis VL, the indoor camera 11 can maintain contact (a suction state) between the lower opening 77 and the installation surface 39 by the downward erecting portion 103. Further, since the suction cup lower portion 55 is deflected in the space between the free space forming portion 101 and the lower portion upper surface 61, the indoor camera 11 can distribute a force concentrated on the suction cup lower portion 55 positioned on a side opposite to a point where the external force F is received.

Therefore, the suction cup unit 37 of the indoor camera 11 can improve a suction property to the installation surface 39 even when the indoor camera 11 receives the external force F in the horizontal direction. As described above, the indoor camera 11 according to the first embodiment can prevent an overturn due to the external force F from a side received from a moving object such as a pet, and can more accurately capture an image of the moving object such as the pet that moves around indoors.

The plurality of free space forming portions 101B and 101C are provided on the suction cup core member 49 fitted into the suction cup 21. The free space forming portion 101B forms a free space K2 between the suction cup 21 and the suction cup core member 49. The free space forming portion 101C forms a free space K3 between the suction cup 21 and the suction cup core member 49.

The suction cup core member 49 that pivotally supports the upper opening 79 is pressed and fixed to the suction cup 21. The suction cup 21 is deformed by a pressure applied when the suction cup core member 49 is fixed, and a height of the upper opening 79 is easily formed to be high. That is, when the suction cup core member 49 is fixed, the large predetermined compression allowance A is easily formed in the upper opening 79.

Here, the free spaces K2 and K3 formed by the plurality of free space forming portions 101B and 101C function as spaces in which the suction cup 21 can be freely deformed. Since the suction cup 21 can be freely deformed in the free spaces K2 and K3, the plurality of free space forming portions 101B and 101C prevent excessive deformation of the upper opening 79. Accordingly, when the upper opening 79 is formed to be high due to deformation when the suction cup core member 49 is fixed, the plurality of free space forming portions 101B and 101C can prevent the compression allowance A from being larger than 2.0 mm and can prevent the compression allowance A from being formed to be larger than the predetermined fitting gap B.

Figure 12:
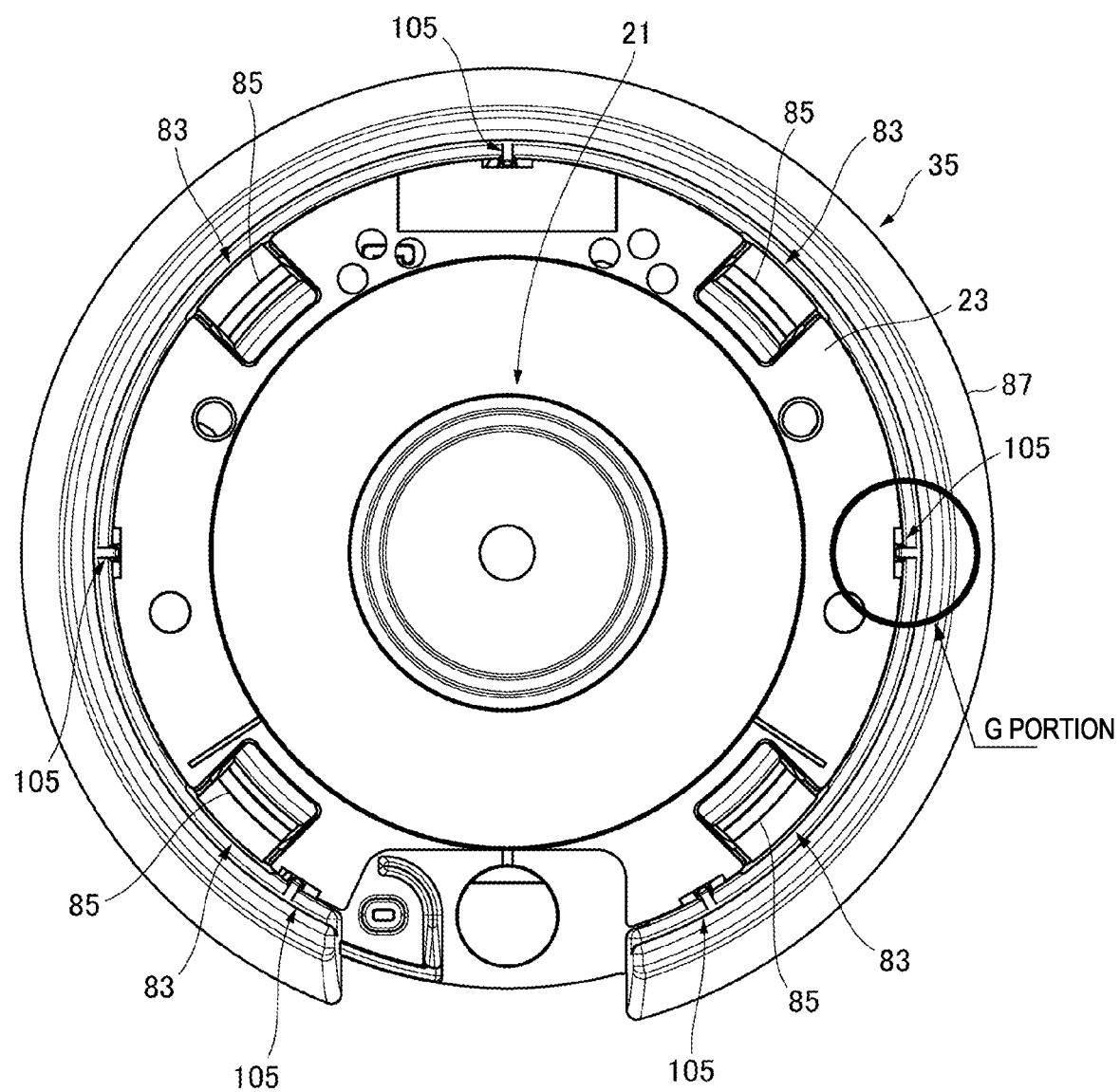
FIG. 12 is a plan view showing clearance setting portions.

FIG. 12 is a plan view showing clearance setting portions 105. FIG. 12 is a plan view of the lower structure of the indoor camera 11 provided with the clearance setting portions 105 when viewed from a bottom surface side.

In the indoor camera 11, the suction cup holder 23 is stored concentrically around the vertical axis VL inside the base cabinet 35 that is the main mechanism portion 51. Between the main mechanism portion 51 and the suction cup holder 23, the plurality of clearance setting portions 105 are provided at least at three locations at equal intervals in a circumferential direction.

Each of the plurality of clearance setting portions 105 is formed by a rib 107 provided on one of the base cabinet 35 and the suction cup holder 23, and a receiving surface 109 provided on the other one of the base cabinet 35 and the suction cup holder 23. Further, in the first embodiment, the rib 107 is formed in the base cabinet 35. The receiving surface 109 is formed on the suction cup holder 23.

Figure 13:
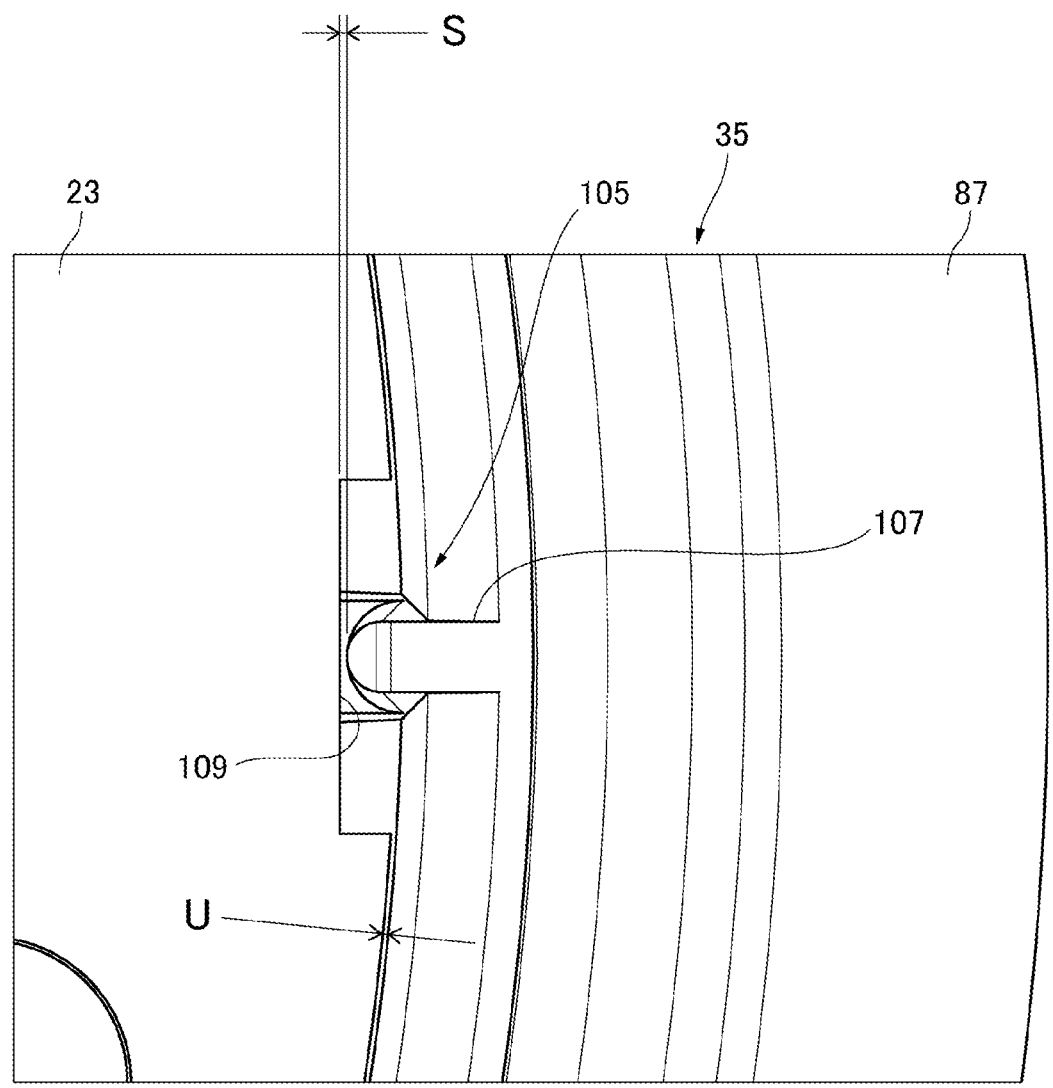
FIG. 13 is an enlarged view of a G portion of the clearance setting portion.

FIG. 13 is an enlarged view of a G portion of the clearance setting portion 105. A structure of the clearance setting portion 105 will be described with reference to FIG. 13.

The clearance setting portion 105 is provided with a predetermined inclination prevention clearance S between the rib 107 and the receiving surface 109 to prevent inclination of the main mechanism portion 51. The inclination prevention clearance S is an inclination allowance of the indoor camera 11 when the external force F in the horizontal direction is received. That is, in the indoor camera 11, the larger the inclination prevention clearance S is, the larger an inclination amount (an angle) of the indoor camera 11 is, so that the compression allowance A of the upper opening 79 of the suction cup 21 is set to be large. Since the compression allowance A is set in this way, the suction cup 21 is formed such that a shape can be deformed according to a size of the inclination prevention clearance S (that is, an inclination allowance of the motor holder 19), and can more stably maintain contact between the upper opening 79 and the contact surface 53 of the motor holder 19. Here, the inclination prevention clearance S adopted in the first embodiment is S=0.1 mm. The inclination prevention clearance S is not limited to S=0.1 mm and may be, for example, S≤0.5 mm.

Since the clearance setting portion 105 is provided, the indoor camera 11 can set a gap U between the suction cup holder 23 and the base cabinet 35 other than the clearance setting portion 105 to be larger than the inclination prevention clearance S. Accordingly, the base cabinet 35 and the suction cup holder 23 are easy to fit during assembly.

The suction cup 21 of the indoor camera 11 is formed to have the predetermined rubber hardness C. The predetermined compression allowance A is set for the suction cup 21 according to a numerical value of the rubber hardness C. Specifically, when the rubber hardness C is large (a numerical value close to C=40°), the suction property of the suction cup 21 is reduced, so that the compression allowance A is formed to be small (a numerical value close to A=0.9 mm). On the other hand, when the rubber hardness C is small (a numerical value close to C=30°), the suction cup 21 is easily compression and the suction property is improved, so that the compression allowance A is formed to be large (a numerical value close to A=2.0 mm).

Figure 14:
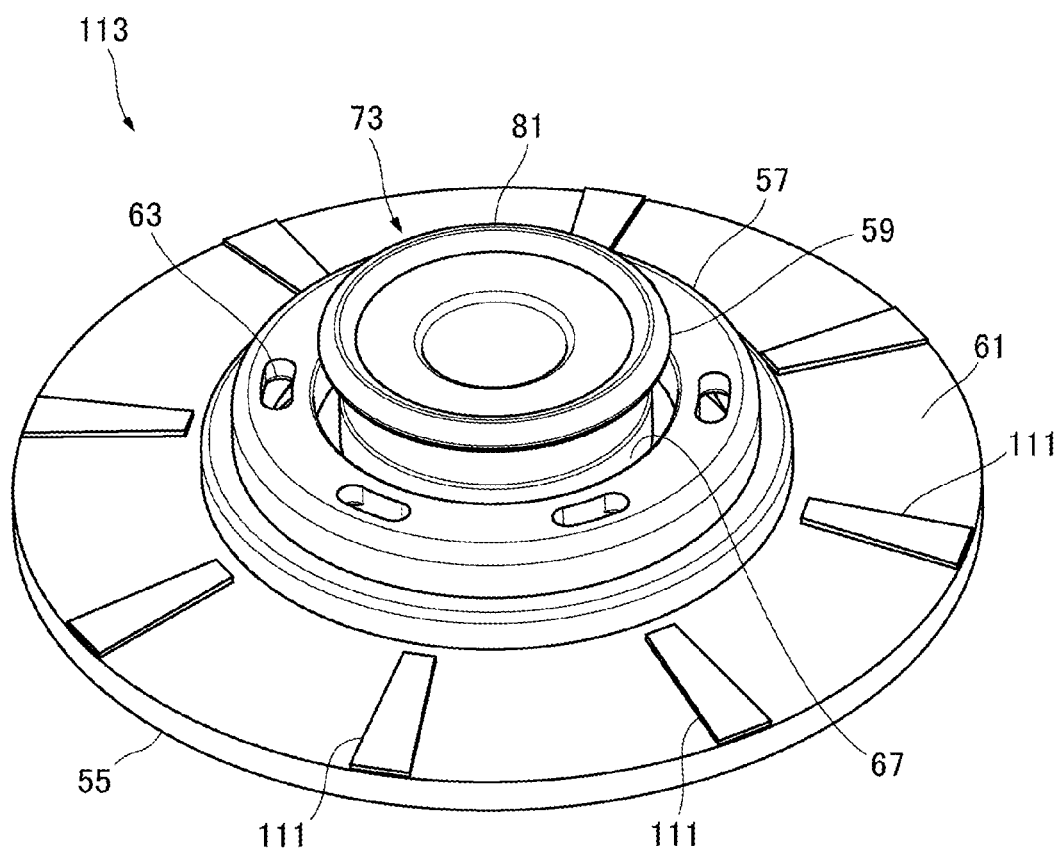
FIG. 14 is a perspective view of a suction cup according to a first modification in which radial ribs are formed.

FIG. 14 is a perspective view of a suction cup 113 according to a first modification in which radial ribs 111 are formed. The suction cup 113 as the first modification of the suction cup 21 will be described with reference to FIG. 14.

In the indoor camera 11, vibration is generated by driving of the tilt mechanism 15 and the pan mechanism 17. The vibration is transmitted from the suction cup unit 37 and the base cabinet 35 to the suction cup unit 37 via the motor holder 19 and the like. The vibration transmitted to the suction cup unit 37 is transmitted to the installation surface 39 via the suction cup 21. At this time, in the indoor camera 11, a blur may occur in a captured video captured by the image capturing unit 13 depending on a magnitude of the vibration, a rigidity of the installation surface 39, or the like. Further, in a case where the indoor camera 11 includes a microphone, when abnormal noise is generated due to the vibration, the abnormal noise may be collected by the microphone.

The suction cup 113 according to the first modification is formed by including the plurality of radial ribs 111 on the lower portion upper surface 61 of the suction cup lower portion 55. The plurality of radial ribs 111 are formed in a radial direction on the lower portion upper surface 61, and are formed such that a height of a center of the suction cup 21 (that is, the vertical axis VL) is largest and the height decreases toward a peripheral edge of the suction cup 21. The plurality of radial ribs 111 have a cushion function and have an effect of attenuating the vibration transmitted from the suction cup holder 23 to the suction cup 113. Accordingly, the indoor camera 11 can prevent the abnormal noise caused by the driving of the tilt mechanism 15 and the pan mechanism 17, and reduces the blur of the captured video captured by the image capturing unit 13. Accordingly, in the indoor camera 11, with the addition of the suction cup, the suction cup 113 can have a function as a foot rubber, and stability and quietness of a product can be improved. In the suction cup 113 according to the first modification, the free space K1 is formed between the suction cup 113 and the adjacent radial ribs 111.

Figure 15:
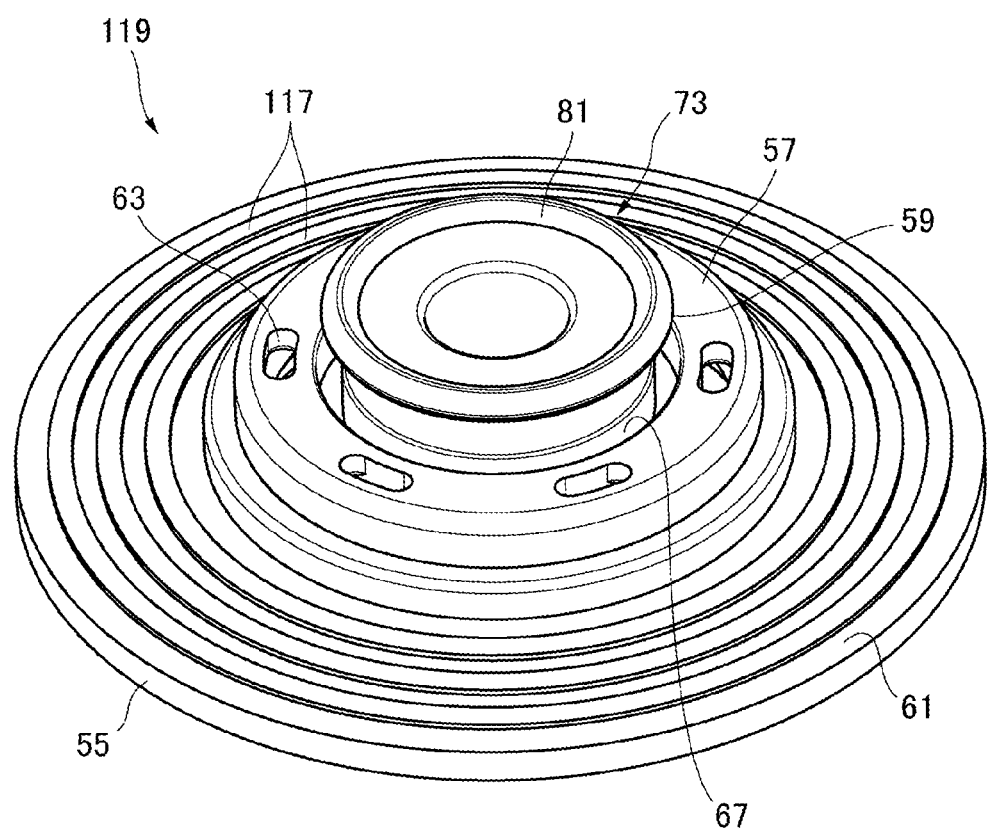
FIG. 15 is a perspective view of a suction cup according to a second modification in which circumferential ribs are formed.

FIG. 15 is a perspective view of a suction cup 119 according to a second modification in which circumferential ribs 117 are formed. The suction cup 119 as the second modification of the suction cup 21 will be described with reference to FIG. 15.

In the suction cup 119 according to the second modification, the plurality of circumferential ribs 117 that are concentric circles around the vertical axis VL are formed on the lower portion upper surface 61 of the suction cup lower portion 55. The plurality of circumferential ribs 117 can exert a cushion function, have an effect of attenuating vibration transmitted from the suction cup holder 23 to the suction cup 119, and reduce a blur of a captured video captured by the image capturing unit 13. As a result, the indoor camera 11 can prevent abnormal noise caused by driving of the tilt mechanism 15 and the pan mechanism 17, and can improve stability and quietness of a product. In the suction cup 119 according to the second modification, the free space K1 is formed between the suction cup 119 and the adjacent circumferential ribs 117.

Figure 16:
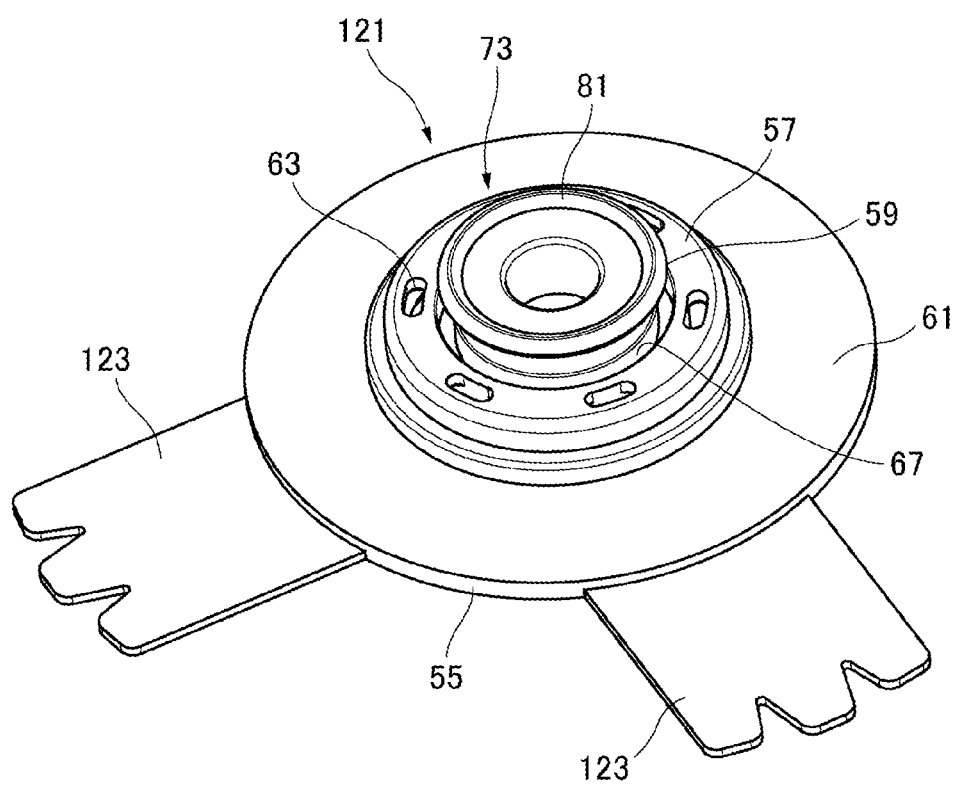
FIG. 16 is a perspective view of a suction cup according to a third modification in which protruding portions are formed on an outer side in a radial direction.

FIG. 16 is a perspective view of a suction cup 121 according to a third modification in which protruding portions are formed on an outer side in a radial direction. The suction cup 121 as the third modification of the suction cup 21 will be described with reference to FIG. 16.

Generally, the user tends to be more cautious because images are always captured by the indoor camera 11 when the indoor camera 11 is present, and the user may not be able to relax even at home. Further, in the indoor camera 11 itself, the image capturing unit 13 may not be suitable for a room. Therefore, in the indoor camera 11, it is considered that the suction cup 121 is formed in a shape different from the substantially circular shapes described above, and has an appearance more suitable for the room.

Therefore, the suction cup 121 according to the third modification includes, for example, a pair of leg portions 123 on an outer periphery of the suction cup 121. The leg portion 123 has a shape in which a tip end side facing an outer side in a radial direction of a center protrudes in a substantially W shape. The shape is, for example, a shape imitating a foot of an animal such as a duck, a penguin, a rabbit, a dog, and a cat. Even in this case, a height of the base cabinet 35 may be set to be high such that the predetermined gap D is secured between the leg portion 123 and the installation surface 39. Further, the height of the base cabinet 35 may be set such that a height from a surface of the leg portion 123 of the suction cup 121 according to the third modification to the base cabinet 35 is the gap D. Further, a cutout (not shown) may be formed in the base cabinet 35 such that the height from the surface of the leg portion 123 to the base cabinet 35 is the gap D according to a position of the leg portion 123 of the suction cup 121 according to the third modification.

Figure 17:
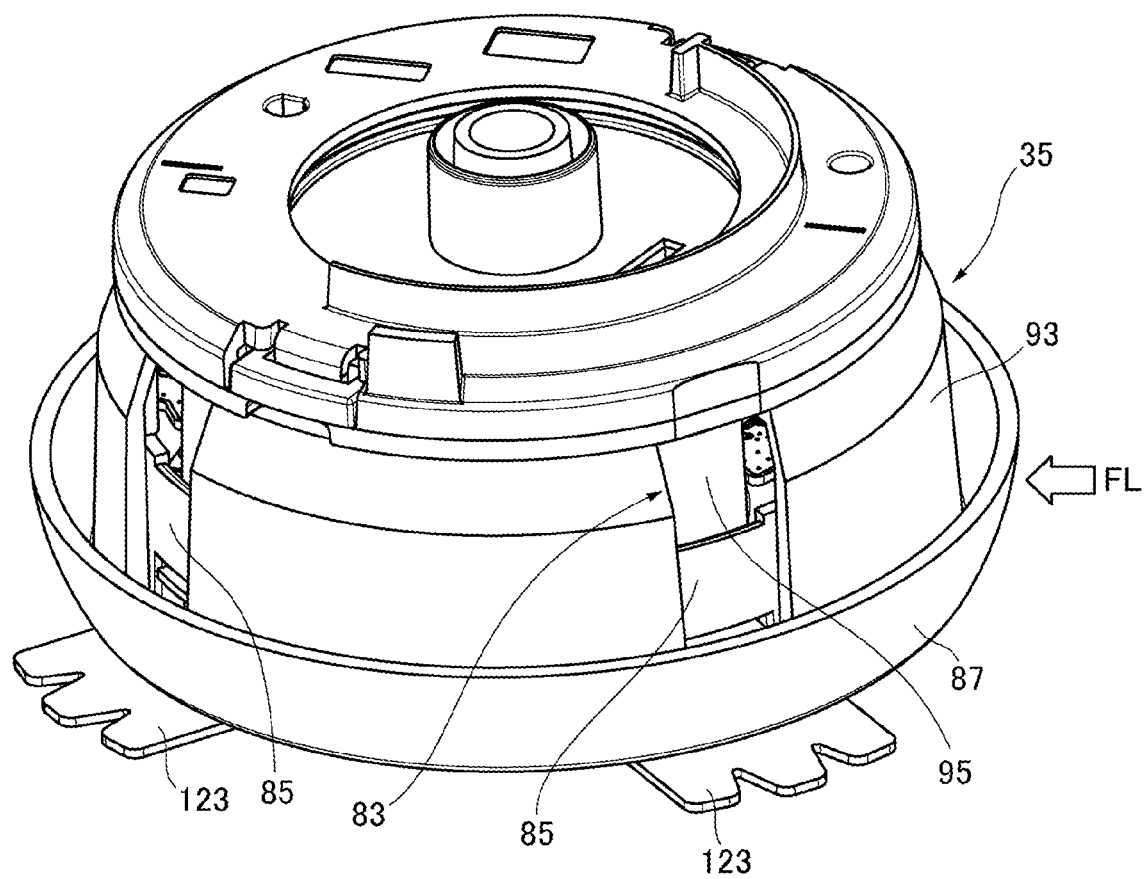
FIG. 17 is a perspective view showing a lower structure of the indoor camera using the suction cup according to the third modification.

FIG. 17 is a perspective view showing a lower structure of the indoor camera 11 using the suction cup 121 according to the third modification.

As shown in FIG. 17, the leg portions 123 formed on the suction cup 121 according to the third modification are exposed from a lower portion of the annular frame portion 87 as an appearance of the indoor camera 11. Since the indoor camera 11 includes the suction cup 121 of the third modification including such leg portions 123, the indoor camera 11 can provide a product with cuteness as an indoor camera for a pet at a low product cost without increasing the number of components.

Even when an external force FL in a horizontal direction is received not only on the upper cabinet 31 but also on the annular frame portion 87 provided at a lower position, the leg portions 123 exposed as the appearance of the indoor camera 11, adhere to the installation surface 39 since the leg portions are formed with the predetermined rubber hardness C, and function as anti-slips while increasing an installation area between the indoor camera 11 and the installation surface 39. Therefore, the indoor camera 11 in which the suction cup 121 according to the third modification is formed can further prevent an overturn of the indoor camera 11 regardless of a height at which the external force in the horizontal direction is received.

Figure 18:
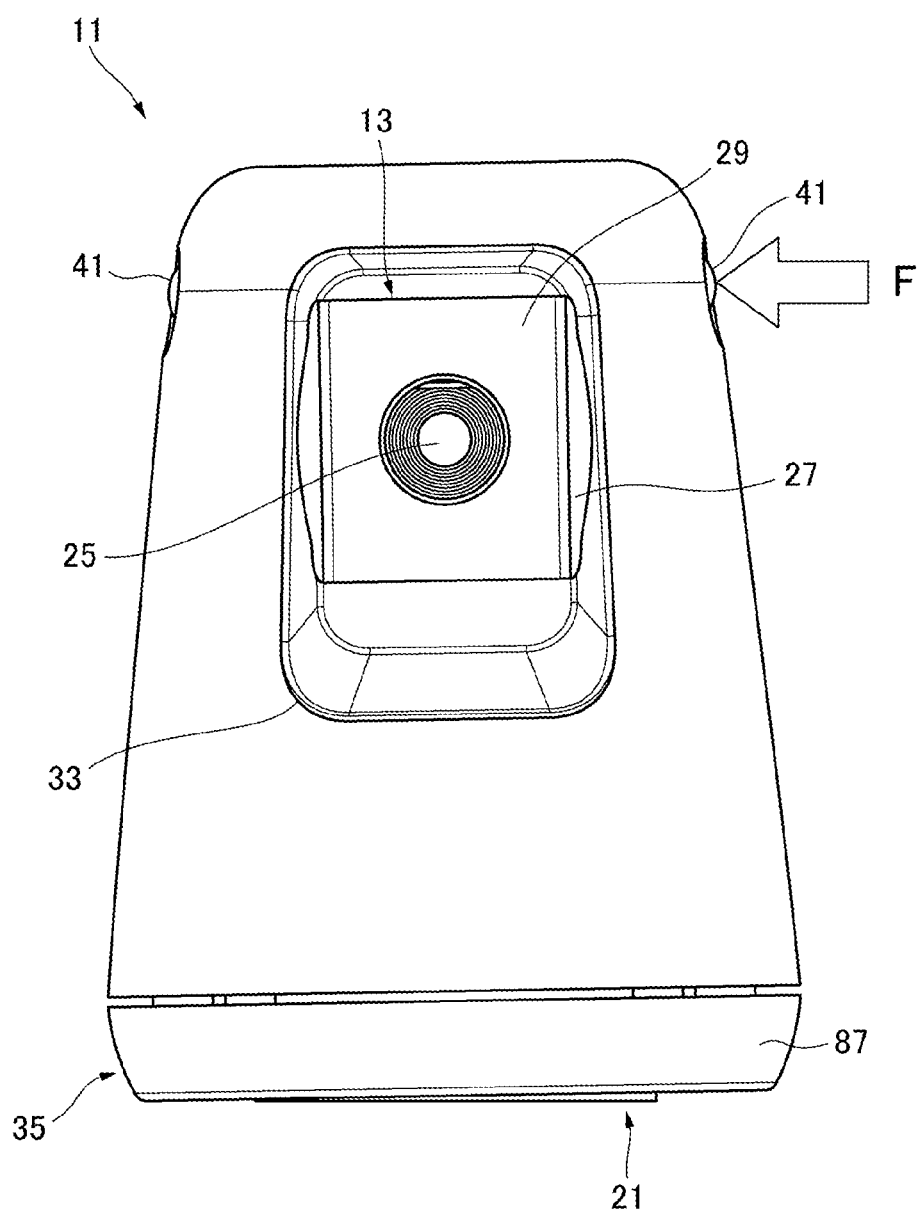
FIG. 18 is a front view of the indoor camera when an external force is applied.

FIG. 18 is a front view of the indoor camera when the external force F is applied.

The indoor camera 11 receives the external force F from a side on the main mechanism portion 51 when a pet approaches or is in contact with the indoor camera 11 in a state where the indoor camera 11 is installed on the installation surface 39. At this time, the indoor camera 11 is integrated with the main mechanism portion 51, and the motor holder 19 placed on the suction cup unit 37 is inclined.

Figure 19:
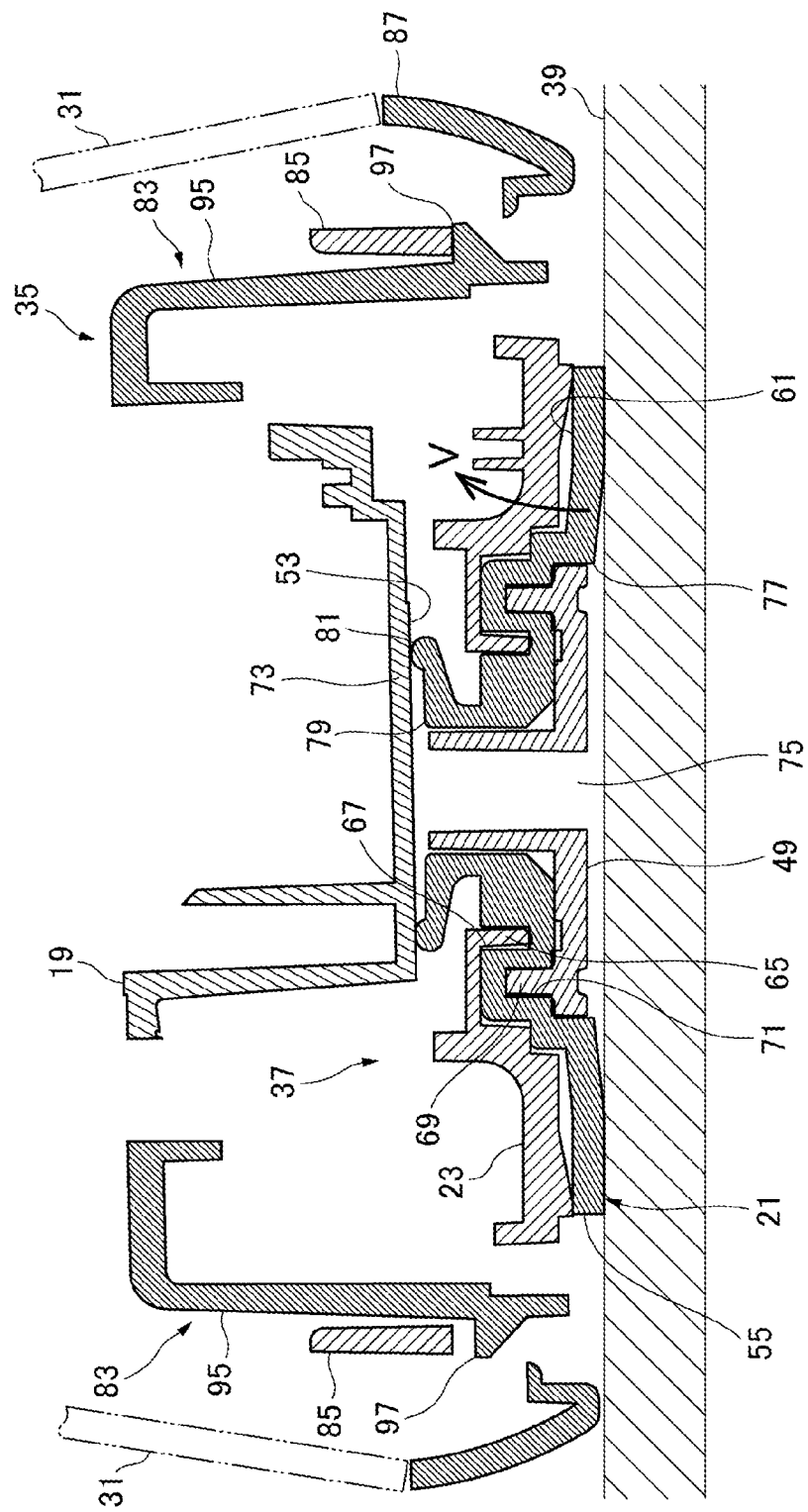
FIG. 19 is a vertical cross-sectional view showing the lower structure of the indoor camera when the external force is applied.

FIG. 19 is a vertical cross-sectional view showing the lower structure of the indoor camera 11 when the external force F is applied.

When the indoor camera 11 receives the external force F, the peripheral edge portion of the upper opening 79 of the suction cup 21 maintains a state of being in contact with the motor holder 19 (that is, a closed state). When the main mechanism portion 51 is inclined, the indoor camera 11 is elastically deformed in an arrow V direction such that the lower opening 77 of the suction cup 21 is peeled off from the installation surface 39. The elastic deformation is a deformation that increases a volume of the internal space 75 in the suction cup 21. Accordingly, based on an increase in the volume of the internal space 75, the suction cup 21 in which the lower opening 77 and the upper opening 79 are closed can maintain a suction state between the lower opening 77 and the installation surface 39 while the internal space 75 becomes a negative pressure as compared with an atmospheric pressure.

The suction cup 21 in which the internal space 75 has the negative pressure maintains a suction state between the upper opening 79 and the motor holder 19 and a suction state between the lower opening 77 and the installation surface 39. As a result, the indoor camera 11 prevents an overturn even when the external force F from the side is received.

On the other hand, when the indoor camera 11 in an installed state is lifted in a vertical direction from the installation surface 39 by the user, the load of the main mechanism portion 51 supported by the upper opening 79 of the suction cup 21 is eliminated. Accordingly, the internal space 75 of the suction cup 21 is no longer a sealed space because a contact state between the upper opening 79 and the contact surface 53 of the motor holder 19 is easily released. Therefore, the indoor camera 11 can be easily lifted (see FIG. 8).

Therefore, even when the indoor camera 11 receives the external force F in the horizontal direction from the side of the indoor camera 11 caused by a pet when the pet such as a cat moves, for example, walks or jumps, or plays nearby, the lower opening 77 of the suction cup 21 is deformed and the volume of the internal space 75 is expanded, and an atmospheric pressure inside the internal space 75 is in a negative pressure state as compared with an atmospheric pressure to maintain a suction state to the installation surface 39, so that overturn and fall are prevented. On the other hand, when the indoor camera 11 is lifted in a vertical direction from the installation surface 39 by the user, the contact state between the upper opening 79 and the contact surface 53 of the motor holder 19 is easily released and the indoor camera 11 is lifted.

In the indoor camera 11, the load of the main mechanism portion 51 is supported by the motor holder 19. The motor holder 19 closes the upper opening 79 by the contact surface 53 formed on a bottom surface of the motor holder 19, and applies the load of the main mechanism portion 51 to the suction cup 21. That is, in the motor holder 19, the contact surface 53 functions as a control valve that controls opening and closing of the upper opening 79. Since the motor holder 19 that supports the load of the main mechanism portion 51 has the function of the control valve, the indoor camera 11 does not provide a dedicated suction cup control member that controls opening and closing of the suction cup 21, and can control a suction state or release of the suction state of the suction cup 21 and release and maintenance of a sealed state of the internal space 75 of the suction cup 21 with a small number of components.

Figure 20:
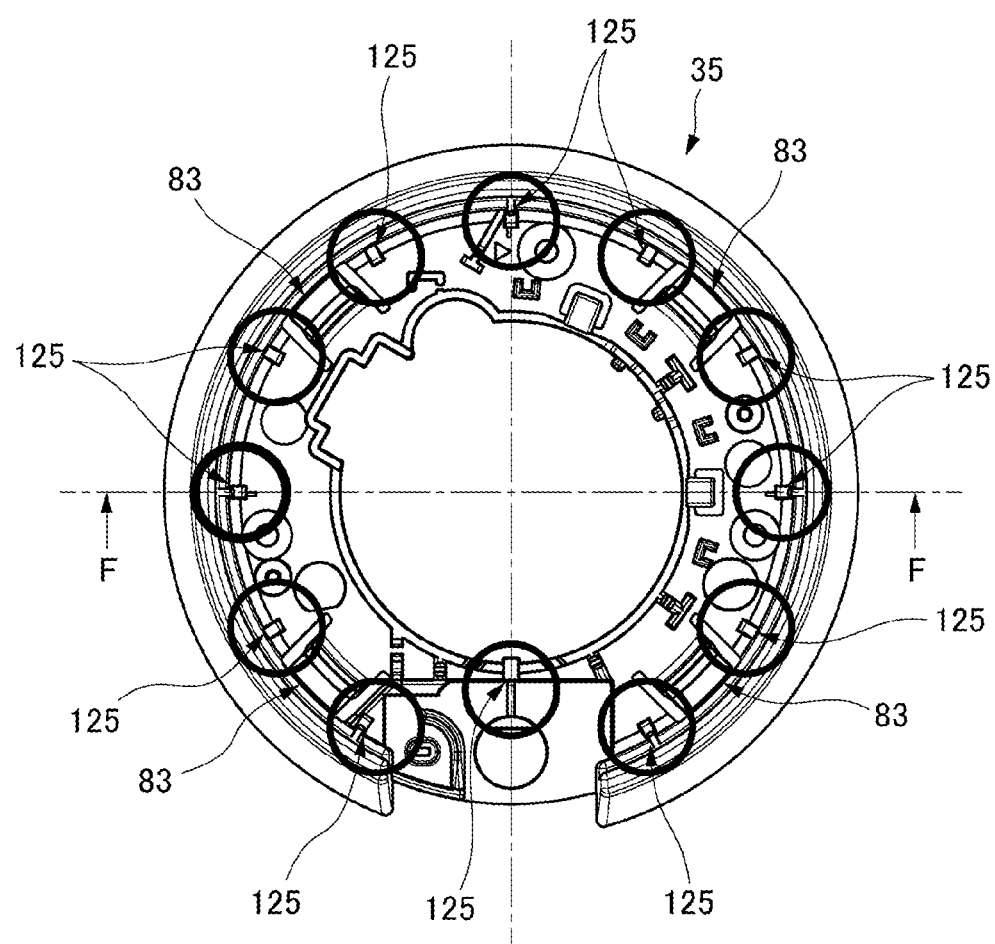
FIG. 20 is a plan view showing the base cabinet when viewed from a bottom surface side of the indoor camera.
Figure 21:
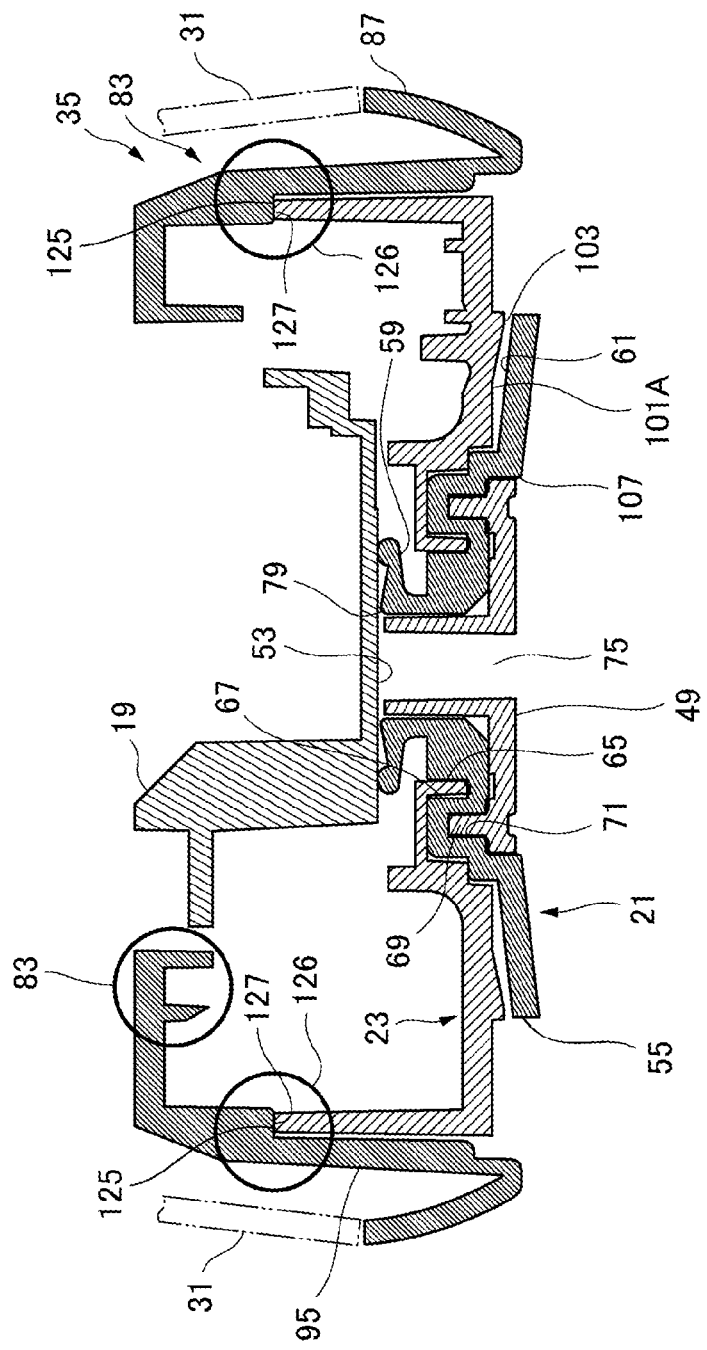
FIG. 21 is a cross-sectional view taken along a line F-F showing the lower structure of the indoor camera.

FIG. 20 is a plan view showing the base cabinet 35 when viewed from a bottom surface side of the indoor camera 11. FIG. 21 is a cross-sectional view taken along a line F-F showing the lower structure of the indoor camera 11. A structure in which vibration (oscillation) of the main mechanism portion 51 can be further prevented will be described with reference to FIGS. 20 and 21. In FIG. 20, only the base cabinet 35 is shown, and other configurations are omitted.

As shown in FIGS. 20 and 21, the base cabinet 35 faces a plurality of base cabinet support portions 127 of the suction cup holder 23 and is provided with a plurality of step portions 125. Further, the suction cup holder 23 is provided with the plurality of base cabinet support portions 127 at positions corresponding to positions of the plurality of step portions 125 of the base cabinet 35.

When the indoor camera 11 is installed on the installation surface 39 by the user, the suction cup 21 is in a contact state with the motor holder 19 and the installation surface 39, and then the plurality of base cabinet support portions 127 support the plurality of step portions 125 to form a plurality of peripheral edge support portions 126. The plurality of peripheral edge support portions 126 are provided at least at twelve locations at equal intervals in a circumferential direction in the examples shown in FIGS. 20 and 21. The plurality of step portions 125 provided on the base cabinet 35 are supported by the plurality of base cabinet support portions 127 of the suction cup holder 23 to form the plurality of peripheral edge support portions 126, and the load of the main mechanism portion 51 is distributed to a peripheral edge of the indoor camera 11.

Accordingly, the load of the main mechanism portion 51 of the indoor camera 11 can be supported more stably not only by the upper opening 79 of the suction cup 21 that is a central portion of the indoor camera 11 but also by the plurality of peripheral edge support portions 126. Further, since the plurality of peripheral edge support portions 126 are formed, the indoor camera 11 can further prevent vibration of the main mechanism portion 51 including the tilt motor 45 and the pan motor 47.

In the cross-sectional views shown in FIGS. 6 and 8, the base cabinet support portions 127, the step portions 125, and the peripheral edge support portions 126 are not shown because cross-sectional lines are different.

Accordingly, the indoor camera 11 can support the base cabinet 35 and prevent vibration of the main mechanism portion 51 by the plurality of peripheral edge support portions 126 provided on an outer side in a radial direction with respect to the suction cup 21 (that is, a peripheral edge) that supports the load of the main mechanism portion 51 and at high positions. Therefore, the suction cup 21 of the indoor camera 11 can distribute vibration of the indoor camera 11 to the plurality of peripheral edge support portions 126. As described above, the indoor camera 11 according to the first embodiment can prevent an overturn due to the external force F from a side received from a moving object such as a pet, and can more accurately capture an image of the moving object such as the pet that moves around indoors.

As described above, the indoor camera 11 according to the first embodiment includes: an image capturing unit 13; a tilt mechanism 15 configured to drive a tilt motor 45 to rotate the image capturing unit around a horizontal axis HL; a pan mechanism 17 configured to drive a pan motor 47 to rotate the image capturing unit around a vertical axis VL; a motor holder 19 configured to support a load of a main mechanism portion 51 that houses the image capturing unit 13, the tilt mechanism 15, and the pan mechanism 17 and include a contact surface 53 parallel to the horizontal axis HL on a bottom surface; a suction cup 21 that includes an internal space 75, is formed of an elastic member, and includes an upper opening 79 in an upper portion of the internal space 75 and a lower opening 77 in a lower portion of the internal space 75; and a suction cup holder 23 configured to be fixed to the suction cup 21 and support the load of the main mechanism portion 51. The lower opening 77 is closed by the installation surface 39 on which the suction cup 21 is installed, and the upper opening 79 is configured to seal the internal space by supporting the contact surface 53 by the load of the main mechanism portion.

Accordingly, in the indoor camera 11 according to the first embodiment, the internal space 75 is sealed by the installation surface 39 on which the indoor camera 11 is installed (for example, on a table, on a closet, on a bed, and on a bookshelf) and the contact surface 53 of the motor holder 19. Therefore, when the indoor camera 11 receives the external force F in the horizontal direction from the side received from the moving object such as the pet, the lower opening 77 of the suction cup 21 is deformed and stretched, and the internal space 75 is expanded to put the internal space 75 in a negative pressure state. That is, in the indoor camera 11, due to the external force F in the horizontal direction, the internal space 75 is instantaneously in a negative pressure state and is in a suction state with the installation surface 39, so that the indoor camera 11 can prevent an overturn and more accurately capture an image of the moving object such as the pet that moves around indoors.

The main mechanism portion 51 includes the tilt mechanism 15 driven by the tilt motor 45, the pan mechanism 17 driven by the pan motor 47, an exterior member, and an electrical component 91. The image capturing unit 13 provided in the indoor camera 11 can be automatically tilt-rotated and pan-rotated by the tilt mechanism 15 and the pan mechanism 17. Therefore, the indoor camera 11 can change the image capturing region of the image capturing unit 13 such that an image of the pet can be captured from a bird's-eye view according to a place where the camera is installed, and can more accurately capture an image of the pet.

The tilt mechanism 15 and the pan mechanism 17 are placed on and supported by the motor holder 19. In the indoor camera 11, constituent members such as the tilt mechanism 15, the pan mechanism 17, the exterior member, and the electrical component 91, excluding the suction cup unit 37, are supported by the motor holder 19. That is, the motor holder 19 is integrated with the main mechanism portion 51. In the indoor camera 11, the load of the main mechanism portion 51 is applied to the suction cup unit 37 via the motor holder 19. Here, the contact surface 53 parallel to the horizontal axis HL is formed on the lower surface of the motor holder 19.

The suction cup 21 that supports the motor holder 19 includes the upper opening 79. The upper opening 79 communicates with the internal space 75 formed inside the suction cup 21. Further, the suction cup 21 includes the lower opening 77 that communicates with the internal space 75 at a lower portion thereof. Therefore, in the suction cup 21, the internal space 75 is opened through both the upper opening 79 and the lower opening 77. In other words, in the suction cup 21, the upper opening 79 and the lower opening 77 are closed.

The motor holder 19 is placed on an upper portion of the suction cup 21 with the upper opening 79 of the suction cup 21 closed by the contact surface 53 formed on the lower surface. The suction cup 21 to which the load of the main mechanism portion 51 is applied via the motor holder 19 is closed by pressing the lower opening 77 against the installation surface 39.

The suction cup 21 formed of an elastic member is installed on the installation surface 39, and when the motor holder 19 is placed on the upper portion, the suction cup 21 is compressed by the load of the main mechanism portion 51 and elastically deformed.

The peripheral edge portion of the indoor camera 11 according to the first embodiment is compressed (deformed) with a predetermined compression allowance A by the load of the main mechanism portion 51 received from the contact surface 53. Here, the suction cup 21 needs to be deformed according to an upright or inclined state of the indoor camera 11 (that is, the main mechanism portion 51) when receiving the external force F in the horizontal direction. When the indoor camera 11 is inclined by the external force F, the contact surface 53 of the motor holder 19 is similarly inclined to be separated from the upper opening 79 of the suction cup 21. The suction cup 21 needs to maintain a state where the upper opening 79 of the suction cup 21 is in contact with the contact surface 53 (that is, the sealed state of the internal space 75) even when the motor holder 19 is inclined to the maximum. Therefore, in a state where the indoor camera 11 is installed on the installation surface 39, the peripheral edge portion of the suction cup 21 needs to be compressed by a predetermined height or more that can maintain a contact state between the suction cup 21 and the contact surface 53 by a distance at which one end on a side opposite to an inclination direction of the contact surface 53 is separated from the other end of the suction cup 21. Here, the indoor camera 11 is set as the predetermined compression allowance A. The predetermined compression allowance A is set to, for example, 0.4 to 2.0 mm. In the indoor camera 11 according to the first embodiment, the predetermined compression allowance A is set to A=0.9 mm.

Accordingly, the indoor camera 11 according to the first embodiment can maintain the contact state between the contact surface 53 of the motor holder 19 and the upper opening 79 of the suction cup 21 even when the motor holder 19 is separated to the maximum by the external force F in the horizontal direction.

The peripheral edge portion of the indoor camera 11 according to the first embodiment includes the R-shaped portion 81 on a surface facing the contact surface 53 in a cross-sectional shape along the vertical axis VL. The suction cup 21 is in contact with the contact surface 53 of the motor holder 19 and is compressed (deformed) by receiving a weight of the main mechanism portion 51. At this time, the suction cup 21 is deformed such that an inner side of the upper opening 79 is turned outward by being compressed. Here, for example, in a case where the peripheral edge portion of the suction cup 21 is flat, when the inner side of the suction cup 21 is turned outward, a gap is formed between the suction cup 21 and the contact surface 53 of the motor holder 19, so that the suction cup 21 is easily separated from the contact surface 53. That is, the suction cup 21 is less likely to maintain the sealed state of the internal space 75. Therefore, in the indoor camera 11 according to the first embodiment, since the R-shaped portion 81 is formed on the peripheral edge portion, even when the suction cup 21 is compressed and the inner side thereof is turned outward, a contact state between the R-shaped portion 81 and the contact surface 53 can be maintained more stably. A numerical value of the R-shaped portion 81 adopted in the first embodiment is, for example, R=1 mm.

In the indoor camera 11 according to the first embodiment, the predetermined fitting gap B that allows the motor holder 19 to move upward with respect to the suction cup holder 23 is provided between the main mechanism portion 51 and the suction cup holder 23. Here, the predetermined fitting gap B is set to be larger than the predetermined compression allowance A. Accordingly, when the indoor camera 11 according to the first embodiment is lifted in a vertical direction by the user, the contact state between the upper opening 79 of the suction cup 21 and the contact surface 53 of the motor holder 19 can be released first (that is, the sealed state of the internal space 75 is released), and then the contact between the lower opening 77 and the installation surface 39 can be released.

In the indoor camera 11 according to the first embodiment, the main mechanism portion 51 and the suction cup holder 23 are connected by the fitting claws 83 and the fitting portions 85 that are fitted with the predetermined fitting gap B, and the fitting claws 83 and the fitting portions 85 are provided at least at four locations at equal intervals in the circumferential direction of the main mechanism portion 51 and the suction cup holder 23, which are formed to have a substantially circular outer shape in a plan view. The fitting claws 83 and the fitting portions 85 may be installed at four or more locations. Accordingly, in the indoor camera 11 according to the first embodiment, the predetermined fitting gap B set in the circumferential direction of the indoor camera 11 can be set more uniformly, and the contact state between the upper opening 79 of the suction cup 21 and the contact surface 53 of the motor holder 19 can be released more stably. Further, the indoor camera 11 can prevent rattling in a circumferential direction between the motor holder 19 and the suction cup holder 23 connected by the fitting claws 83 and the fitting portions 85.

A rubber hardness of the suction cup 21 of the indoor camera 11 according to the first embodiment is substantially 30° to 50°. When the rubber hardness C of the suction cup 21 is lower than 40°, the rubber becomes sticky and a suction property is improved. On the other hand, shape stability is reduced. Further, when the rubber hardness C of the suction cup 21 is higher than 40°, the stickiness becomes weak and the suction property is decreased, but the shape stability is improved. Therefore, specifically, the suction cup 21 preferably has a predetermined rubber hardness C in a range of 30 to 50°. A numerical value of the predetermined rubber hardness C adopted in the first embodiment is C=40°.

In the indoor camera 11 according to the first embodiment, a predetermined gap D is formed between a lower end of the main mechanism portion 51 (that is, a lower end of the base cabinet 35) and the installation surface 39 while the motor holder 19 is placed on the suction cup 21 and the loads of the main mechanism portion 51 and the motor holder 19 are supported by the suction cup 21. Accordingly, when the indoor camera 11 according to the first embodiment receives the external force F in the horizontal direction from the side of the indoor camera 11, a lower end of the base cabinet 35 on a side opposite to the external force F is in contact with the installation surface 39 to serve as a fulcrum, and a reaction force from the installation surface 39 can prevent the indoor camera 11 from being lifted. Here, as for the predetermined gap D, the gap D according to the first embodiment is, for example, D=0.7 mm. The gap D is not limited to D=0.7 mm and may be D≥0.5 mm or more.

The suction cup holder 23 of the indoor camera 11 according to the first embodiment includes the downward erecting portion 103 in contact with the outermost peripheral portion of the lower portion upper surface 61 of the suction cup 21, and includes the free space forming portion 101A separated from the lower portion upper surface 61 of the suction cup 21 on an inner side in a radial direction with respect to the downward erecting portion 103. Accordingly, in the indoor camera 11 according to the first embodiment, the downward erecting portion 103 allows the load of the main mechanism portion 51 to be concentrated on the outermost peripheral portion of the lower portion upper surface 61 of the suction cup 21, and the suction property between the lower opening 77 and the installation surface 39 can be improved. Further, when the indoor camera 11 is inclined by the external force F, the indoor camera 11 can distribute the external force F by freely deforming the lower portion upper surface 61 of the suction cup 21 in the space between the free space forming portion 101A (an example of a first free space forming portion) and the lower portion upper surface 61. Therefore, the indoor camera 11 can prevent an overturn due to the external force F from the side received from a moving object such as a pet, and can more accurately capture an image of the moving object such as the pet that moves around indoors.

A suction cup 113 (see FIG. 14) of the indoor camera 11 according to the first embodiment includes a plurality of radial ribs 111 formed at equal intervals in a circumferential direction around the vertical axis VL on the lower portion upper surface 61. At least a part of the plurality of radial ribs 111 is in contact with the suction cup holder 23. That is, since the plurality of radial ribs 111 are in contact with the suction cup holder 23, the indoor camera 11 can absorb the vibration of the main mechanism portion 51 including the tilt motor 45 and the pan motor 47 via the plurality of radial ribs 111. Accordingly, the indoor camera 11 can prevent the vibration generated by the main mechanism portion 51 and reduce a sound generated by the vibration.

The plurality of radial ribs 111 of the indoor camera 11 according to the first embodiment are formed so as to be highest on a vertical axis VL side and lower toward an outer side in a radial direction of the suction cup 113. Accordingly, the plurality of radial ribs 111 are formed at a height (in a shape) corresponding to a height (a shape) of the facing suction cup holder 23. Therefore, the suction cup 113 can increase a contact area between the suction cup 113 and the suction cup holder 23 by the plurality of radial ribs 111 while maintaining a free space in which a shape of the suction cup 113 can be deformed because of the free space forming portion 101, and can prevent the vibration generated by the main mechanism portion 51 and can further reduce the sound generated by the vibration while preventing the overturn of the indoor camera 11 due to the external force F in the horizontal direction.

A suction cup 119 (see FIG. 15) of the indoor camera 11 according to the first embodiment includes a plurality of circumferential ribs 117 formed in a concentric circular shape around the vertical axis VL on the lower portion upper surface 61. At least a part of the plurality of circumferential ribs 117 is in contact with the suction cup holder 23. That is, since the plurality of circumferential ribs 117 are in contact with the suction cup holder 23, the indoor camera 11 can absorb the vibration of the main mechanism portion 51 including the tilt motor 45 and the pan motor 47 via the plurality of circumferential ribs 117. Accordingly, the indoor camera 11 can prevent the vibration generated by the main mechanism portion 51 and reduce the sound generated by the vibration.

A suction cup 121 (see FIGS. 16 and 17) of the indoor camera 11 according to the first embodiment includes a pair of leg portions 123 formed such that tip end sides facing an outer side in a radial direction around the vertical axis VL protrude in a substantially W shape from the outermost peripheral portion of the lower portion upper surface 61. The pair of leg portions 123 are exposed from an outer shell of the main mechanism portion 51 (that is, the upper cabinet 31, the base cabinet 35, and the annular frame portion 87 of the indoor camera 11). Accordingly, the indoor camera 11 can provide the product with cuteness as an indoor camera for a pet at a low product cost without increasing the number of components. Even when the indoor camera 11 receives an external force FL in a horizontal direction not only on the upper cabinet 31 but also on the annular frame portion 87 provided at a lower position, the leg portions 123 exposed as an appearance of the indoor camera 11 adhere to the installation surface 39 since the leg portions 123 are formed with a predetermined rubber hardness C, and function as anti-slips while increasing an installation area between the indoor camera 11 and the installation surface 39. Therefore, the indoor camera 11 in which the suction cup 121 according to the third modification is formed can further prevent an overturn of the indoor camera 11 regardless of a height at which the external force in the horizontal direction is received.

The indoor camera 11 according to the first embodiment further includes a suction cup core member 49 including erecting pieces 69 to be fitted into a core member fitting portion 71 formed in the suction cup 21. The suction cup core member 49 is in contact with the suction cup 21 by the erecting pieces 69 being fitted into the core member fitting portion 71, and includes one or more free space forming portions 101B and 101C (an example of a second free space forming portion) in which the suction cup core member 49 is separated from the suction cup 21. Accordingly, the indoor camera 11 according to the first embodiment can prevent a fact that the upper opening 79 is formed to be high due to deformation and the compression allowance A becomes large when the suction cup 21 is fixed to the suction cup core member 49. Further, the plurality of free space forming portions 101B and 101C can prevent the compression allowance A from being formed to be larger than the predetermined fitting gap B, and can facilitate a suction state and release of the suction state of the suction cup 21.

In the indoor camera 11 according to the first embodiment, the suction cup holder 23 is stored concentrically around the vertical axis VL inside the main mechanism portion 51, and a predetermined inclination prevention clearance S that prevents an inclination of the main mechanism portion 51 is provided between an inner periphery of the main mechanism portion 51 and an outer periphery of the suction cup holder 23. Accordingly, in the indoor camera 11 according to the first embodiment, when the main mechanism portion 51 receives the external force F from a side, an inclination of the main mechanism portion 51 when viewed with reference to the suction cup holder 23 can be reduced by the predetermined inclination prevention clearance S between an inner periphery of the base cabinet 35 and the outer periphery of the suction cup holder 23.

In the indoor camera 11 according to the first embodiment, between the main mechanism portion 51 and the suction cup holder 23, clearance setting portions 105 for forming the inclination prevention clearance S are provided at least at three or more locations at equal intervals in a circumferential direction, and each of the clearance setting portions 105 includes a rib 107 provided on one of the main mechanism portion 51 and the suction cup holder 23 and a receiving surface 109 provided on the other one of the main mechanism portion 51 and the suction cup holder 23. Further, the clearance setting portion 105 includes the rib 107 and the receiving surface 109, and only the rib 107 and the receiving surface 109 are separated from each other by the narrow inclination prevention clearance S. As for the rib 107 and the receiving surface 109, the receiving surface 109 can be provided on the suction cup holder 23 and the rib 107 can be provided on the base cabinet 35. On the contrary, the rib 107 may be provided on the suction cup holder 23 and the receiving surface 109 may be provided on the base cabinet 35. Accordingly, the indoor camera 11 according to the first embodiment can be easily assembled by providing the inclination prevention clearance S at the clearance setting portions 105 at three or more locations in the circumferential direction instead of entire peripheries of the suction cup holder 23 and the base cabinet 35 even when sizes of components used in the indoor camera 11 formed during mass production are formed with predetermined tolerance dimensions.

The indoor camera 11 according to the first embodiment further includes a plurality of step portions 125 that are formed on the base cabinet 35 of the main mechanism portion 51 and that are for supporting the load of the main mechanism portion 51 on an outer side in a radial direction around the vertical axis VL with respect to the upper opening 79, and a plurality of base cabinet support portions 127 (an example of a support portion) that are formed on the suction cup holder 23, that are formed on an outer side in a radial direction around the vertical axis with respect to the upper opening 79 and at positions corresponding to the plurality of step portions 125, and that support the load of the main mechanism portion 51. The plurality of step portions 125 and the plurality of base cabinet support portions 127 are provided at twelve locations at equal intervals in the circumferential direction. Accordingly, since the indoor camera 11 can distribute and support the load of the main mechanism portion 51 on the peripheral edge of the indoor camera 11, stability when the indoor camera 11 is installed on the installation surface 39 can be improved.

Although various embodiments have been described above with reference to the accompanying drawings, the present disclosure is not limited to these embodiments. It will be apparent to those skilled in the art that various changes, modifications, substitutions, additions, deletions, and equivalents can be conceived within the scope of the claims, and it should be understood that such changes and the like also belong to the technical scope of the present disclosure. Components in the various embodiments mentioned above may be combined optionally in the range without deviating from the spirit of the invention.

The present disclosure is useful as a presentation of an indoor camera that can prevent an overturn due to an external force from a side received from a moving object such as a pet and can more accurately capture an image of the moving object such as a pet that moves around indoors.

The invention claimed is:

1. An indoor camera comprising:
    an image capturing unit;
    a pan mechanism configured to drive a pan motor to rotate the image capturing unit around a vertical axis;
    a motor holder that houses the pan mechanism, the motor holder having a contact surface parallel to a horizontal axis on a bottom surface;
    a suction cup having an internal space and formed of an elastic member, the suction cup having an upper opening in an upper portion of the internal space and a lower opening in a lower portion of the internal space; and
    a suction cup holder fixed to the suction cup and configured to support a load of a main mechanism portion that houses the image capturing unit and the pan mechanism,
    wherein the lower opening is closed by an installation surface on which the suction cup is installed, and
    wherein the upper opening is configured to seal the internal space by supporting the contact surface of the motor holder.

2. The indoor camera according to claim 1,
    wherein a peripheral edge portion of the upper opening is compressed with a predetermined compression allowance by the load received from the contact surface.

3. The indoor camera according to claim 2,
    wherein a surface of the peripheral edge portion facing the contact surface has an R-shaped portion in cross section along the vertical axis.

4. The indoor camera according to claim 3,
    wherein a predetermined fitting gap is provided between the main mechanism portion and the suction cup holder, the predetermined fitting gap that allows the motor holder to move in a vertical direction with respect to the suction cup holder and is larger than the compression allowance.

5. The indoor camera according to claim 4,
    wherein the main mechanism portion and the suction cup holder are connected by fitting claws and fitting portions fitted with the predetermined fitting gap, and
    wherein the fitting claws and the fitting portions are provided at least at four locations at equal intervals in a circumferential direction of the main mechanism portion and the suction cup holder, the main mechanism portion and the suction cup holder being formed to have a substantially circular outer shape in a plan view.

6. The indoor camera according to claim 1,
    wherein a rubber hardness of the suction cup is substantially 30° to 50°.

7. The indoor camera according to claim 1,
    wherein a predetermined gap is formed between a lower end of the main mechanism portion and the installation surface while the motor holder is placed on the suction cup and loads of the main mechanism portion and the motor holder are supported by the suction cup.

8. The indoor camera according to claim 1,
    wherein the suction cup holder comprises:
        a downward erecting portion contacting an outermost peripheral portion of a lower portion upper surface of the suction cup; and
        a first free space forming portion provided on an inner side with respect to the downward erecting portion in a radial direction and separated from the lower portion upper surface of the suction cup.

9. The indoor camera according to claim 8,
    wherein the suction cup comprises a plurality of radial ribs formed at equal intervals in a circumferential direction around the vertical axis on the lower portion upper surface, and
    wherein at least a part of each of the plurality of radial ribs contacts the suction cup holder.

10. The indoor camera according to claim 9,
wherein a height of each of the plurality of radial ribs largest on the vertical axis side and decreases toward an outer side in a radial direction of the suction cup.

11. The indoor camera according to claim 10,
wherein the suction cup comprises a plurality of circumferential ribs formed in a concentric circular shape around the vertical axis on the lower portion upper surface, and
wherein at least a part of each of the plurality of circumferential ribs contacts the suction cup holder.

12. The indoor camera according to claim 8,
wherein the suction cup comprises a pair of leg portions protruding from the outermost peripheral portion of the lower portion upper surface toward an outer side in a radial direction around the vertical axis, each of the pair of leg portions having a tip end side being formed in a substantially W shape, and
wherein the pair of leg portions are exposed from an outer shell of the main mechanism portion.

13. The indoor camera according to claim 1, further comprising:
a suction cup core member comprising an erecting piece configured to be fitted into a core member fitting portion formed in the suction cup,
wherein the suction cup core member contacts the suction cup by the erecting piece being fitted into the core member fitting portion, and the suction cup core member comprises one or more second free space forming portions in which the suction cup core member is separated from the suction cup.

14. The indoor camera according to claim 1,
wherein the suction cup holder is stored concentrically inside the main mechanism portion, and
wherein a predetermined inclination prevention clearance configured to prevent an inclination of the main mechanism portion is provided between an inner periphery of the main mechanism portion and an outer periphery of the suction cup holder.

15. The indoor camera according to claim 14,
wherein between the main mechanism portion and the suction cup holder, at least three clearance setting portions for forming the inclination prevention clearance are provided at equal intervals in a circumferential direction, and
wherein the clearance setting portion comprises a rib provided on one of the main mechanism portion and the suction cup holder, and a receiving surface provided on the other of the main mechanism portion and the suction cup holder.

16. The indoor camera according to claim 14, further comprising:
a plurality of step portions formed on the main mechanism portion, the plurality of step portions allowing the load of the main mechanism portion to be supported on an outer side with respect to the upper opening in a radial direction around the vertical axis; and
a plurality of support portions formed on the suction cup holder on an outer side with respect to the upper opening in a radial direction around the vertical axis at positions corresponding to the plurality of step portions, and the plurality of support portions being configured to support the load of the main mechanism portion,
wherein the plurality of step portions and the plurality of support portions are provided at twelve locations at equal intervals in a circumferential direction.

17. The indoor camera according to claim 1, further comprising:
a tilt mechanism hosed housed in the main mechanism portion and configured to drive a tilt motor to rotate the image capturing unit around a horizontal axis.

18. An indoor camera comprising:
an image capturing unit;
a pan mechanism configured to drive a pan motor to rotate the image capturing unit around a vertical axis;
a motor holder that houses the pan mechanism, the motor holder having a contact surface parallel to a horizontal axis on a bottom surface;
a suction cup having an internal space and formed of an elastic member, the suction cup having an upper opening in an upper portion of the internal space and a lower opening in a lower portion of the internal space; and
a suction cup holder fixed to the suction cup and configured to support a load of a main mechanism portion that houses the image capturing unit and the pan mechanism,
wherein the lower opening is closed by an installation surface on which the suction cup is installed,
wherein the upper opening is configured to seal the internal space by supporting the contact surface by the load of the main mechanism portion,
wherein a peripheral edge portion of the upper opening is compressed with a predetermined compression allowance by the load received from the contact surface, and
wherein a surface of the peripheral edge portion facing the contact surface has an R-shaped portion in cross section along the vertical axis.

19. An indoor camera comprising:
an image capturing unit;
a pan mechanism configured to drive a pan motor to rotate the image capturing unit around a vertical axis;
a motor holder that houses the pan mechanism, the motor holder having a contact surface parallel to a horizontal axis on a bottom surface;
a suction cup having an internal space and formed of an elastic member, the suction cup having an upper opening in an upper portion of the internal space and a lower opening in a lower portion of the internal space; and
a suction cup holder fixed to the suction cup and configured to support a load of a main mechanism portion that houses the image capturing unit and the pan mechanism,
wherein the lower opening is closed by an installation surface on which the suction cup is installed,
wherein the upper opening is configured to seal the internal space by supporting the contact surface by the load of the main mechanism portion, and
wherein the suction cup holder comprises:
a downward erecting portion contacting an outermost peripheral portion of a lower portion upper surface of the suction cup; and
a first free space forming portion provided on an inner side with respect to the downward erecting portion in a radial direction and separated from the lower portion upper surface of the suction cup.

20. An indoor camera comprising:
an image capturing unit;
a pan mechanism configured to drive a pan motor to rotate the image capturing unit around a vertical axis;
a motor holder that houses the pan mechanism, the motor holder having a contact surface parallel to a horizontal axis on a bottom surface;

a suction cup having an internal space and formed of an elastic member, the suction cup having an upper opening in an upper portion of the internal space and a lower opening in a lower portion of the internal space; and a suction cup holder fixed to the suction cup and configured to support a load of a main mechanism portion that houses the image capturing unit and the pan mechanism; and a tilt mechanism housed in the main mechanism portion and configured to drive a tilt motor to rotate the image capturing unit around a horizontal axis, wherein the lower opening is closed by an installation surface on which the suction cup is installed, wherein the upper opening is configured to seal the internal space by supporting the contact surface by the load of the main mechanism portion.

* * * * *